US012233009B2

(12) United States Patent
Stusynski et al.

(10) Patent No.: US 12,233,009 B2
(45) Date of Patent: *Feb. 25, 2025

(54) CONTROLLING DEVICE FOR ADJUSTABLE BED FOUNDATION

(71) Applicant: Sleep Number Corporation, Minneapolis, MN (US)

(72) Inventors: Stacy Stusynski, Blaine, MN (US); Yi-ching Chen, Maple Grove, MN (US); John McGuire, New Hope, MN (US)

(73) Assignee: Sleep Number Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,861

(22) Filed: Jun. 13, 2023

(65) Prior Publication Data

US 2023/0404825 A1 Dec. 21, 2023

Related U.S. Application Data

(63) Continuation of application No. 17/379,460, filed on Jul. 19, 2021, now Pat. No. 11,712,384, which is a (Continued)

(51) Int. Cl.
*A61G 7/015* (2006.01)
*A47C 20/04* (2006.01)
(Continued)

(52) U.S. Cl.
CPC ............ *A61G 7/015* (2013.01); *A47C 20/041* (2013.01); *A47C 31/008* (2013.01); *A61G 7/018* (2013.01)

(58) Field of Classification Search
CPC ...... A61G 7/015; A61G 7/018; A47C 20/041; A47C 31/008
(Continued)

(56) References Cited

U.S. PATENT DOCUMENTS 3,646,621 A 3/1972 Fragas
3,727,606 A 4/1973 Sielaff
(Continued)

FOREIGN PATENT DOCUMENTS

CN 102014700 4/2011
CN 202589823 12/2012
(Continued)

OTHER PUBLICATIONS

U.S. Appl. No. 16/719,177, filed Dec. 18, 2019, Nunn et al.
(Continued)

*Primary Examiner* — Omar Casillashernandez

(74) *Attorney, Agent, or Firm* — Fish & Richardson P.C.

(57) ABSTRACT

A sleep system comprises at least one mattress including a first sleep area for a first occupant, the first sleep area including a first section for a portion of a body of the first occupant, and a second sleep area adjacent to the first sleep area for a second occupant, the second sleep area including a second section for a portion of a body of the second occupant, an articulation system for articulating the first section and the second section, a first user controller configured to communicate with the articulation system in order to control articulation of the first section, and a second user controller configured to communicate with the articulation system in order to control articulation of the second section, wherein the first user controller is further configured to communicate with the articulation system in order to move the second section into a predetermined position.

17 Claims, 8 Drawing Sheets

Related U.S. Application Data continuation of application No. 16/698,393, filed on Nov. 27, 2019, now Pat. No. 11,096,849, which is a continuation of application No. 16/109,970, filed on Aug. 23, 2018, now Pat. No. 10,492,969, which is a continuation of application No. 14/624,305, filed on Feb. 17, 2015, now Pat. No. 10,058,467, which is a continuation of application No. 13/803,671, filed on Mar. 14, 2013, now Pat. No. 8,984,687.

(51) Int. Cl.
*A47C 31/00* (2006.01)
*A61G 7/018* (2006.01)

(58) Field of Classification Search
USPC .......................................................... 340/4.31
See application file for complete search history.

(56) References Cited

U.S. PATENT DOCUMENTS

| | | | | |
|---|---|---|---|---|
| 3,795,019 | A | | 3/1974 | Fragas |
| 3,998,209 | A | | 12/1976 | Macvaugh |
| 4,146,885 | A | | 3/1979 | Lawson, Jr. |
| 4,299,233 | A | | 11/1981 | Lemelson |
| 4,657,026 | A | | 4/1987 | Tagg |
| 4,662,012 | A | | 5/1987 | Tarbet |
| 4,766,628 | A | | 8/1988 | Greer et al. |
| 4,788,729 | A | | 12/1988 | Greer et al. |
| 4,829,616 | A | | 5/1989 | Walker |
| 4,890,344 | A | | 1/1990 | Walker |
| 4,897,890 | A | | 2/1990 | Walker |
| 4,908,895 | A | | 3/1990 | Walker |
| 4,991,244 | A | | 2/1991 | Walker |
| 4,992,784 | A | * | 2/1991 | Ruttiger ............... A47C 31/008 340/9.1 |
| 5,062,169 | A | | 11/1991 | Kennedy et al. |
| 5,144,706 | A | | 9/1992 | Walker et al. |
| 5,170,522 | A | | 12/1992 | Walker |
| 5,197,490 | A | | 3/1993 | Steiner et al. |
| 5,459,452 | A | | 10/1995 | DePonte |
| 5,509,154 | A | | 4/1996 | Shafer et al. |
| 5,515,865 | A | | 5/1996 | Scanlon |
| 5,537,701 | A | | 7/1996 | Elliott |
| 5,564,140 | A | | 10/1996 | Shoenhair et al. |
| 5,642,546 | A | | 7/1997 | Shoenhair |
| 5,652,484 | A | | 7/1997 | Shafer et al. |
| 5,675,855 | A | | 10/1997 | Culp |
| 5,684,460 | A | | 11/1997 | Scanlon |
| 5,699,038 | A | | 12/1997 | Ulrich et al. |
| 5,724,990 | A | | 3/1998 | Ogino |
| 5,765,246 | A | | 6/1998 | Shoenhair |
| 5,771,511 | A | | 6/1998 | Kummer et al. |
| 5,796,340 | A | | 8/1998 | Miller |
| 5,844,488 | A | | 12/1998 | Musick |
| 5,848,450 | A | | 12/1998 | Oexman et al. |
| 5,903,941 | A | | 5/1999 | Shafer et al. |
| 5,904,172 | A | | 5/1999 | Gifft et al. |
| 5,948,303 | A | | 9/1999 | Larson |
| 5,964,720 | A | | 10/1999 | Pelz |
| 5,989,193 | A | | 11/1999 | Sullivan |
| 6,008,598 | A | | 12/1999 | Luff |
| 6,024,699 | A | | 2/2000 | Surwit et al. |
| 6,037,723 | A | | 3/2000 | Shafer et al. |
| 6,058,537 | A | | 5/2000 | Larson |
| 6,062,216 | A | | 5/2000 | Corn |
| 6,079,065 | A | | 6/2000 | Luff et al. |
| 6,101,647 | A | * | 8/2000 | Stroud ................. A47C 20/041 5/915 |
| 6,108,844 | A | | 8/2000 | Kraft et al. |
| 6,120,441 | A | | 9/2000 | Griebel |
| 6,146,332 | A | | 11/2000 | Pinsonneault et al. |
| 6,147,592 | A | | 11/2000 | Ulrich et al. |
| 6,161,231 | A | | 12/2000 | Kraft et al. |
| 6,202,239 | B1 | | 3/2001 | Ward et al. |
| 6,208,250 | B1 | | 3/2001 | Dixon et al. |
| 6,234,642 | B1 | | 5/2001 | Bokaemper |
| 6,272,378 | B1 | | 8/2001 | Baumgart-Schmitt |
| 6,378,152 | B1 | | 4/2002 | Washburn et al. |
| 6,386,201 | B1 | | 5/2002 | Fard |
| 6,396,224 | B1 | | 5/2002 | Luff et al. |
| 6,397,419 | B1 | | 6/2002 | Mechache |
| 6,438,776 | B2 | | 8/2002 | Ferrand et al. |
| 6,450,957 | B1 | | 9/2002 | Yoshimi et al. |
| 6,468,234 | B1 | | 10/2002 | Ford et al. |
| 6,483,264 | B1 | | 11/2002 | Shafer et al. |
| 6,485,441 | B2 | | 11/2002 | Woodward |
| 6,546,580 | B2 | | 4/2003 | Shimada |
| 6,547,743 | B2 | | 4/2003 | Brydon |
| 6,561,047 | B1 | | 5/2003 | Gladney |
| 6,566,833 | B2 | | 5/2003 | Bartlett |
| 6,643,875 | B2 | | 11/2003 | Boso et al. |
| 6,686,711 | B2 | | 2/2004 | Rose et al. |
| 6,698,432 | B2 | | 3/2004 | Ek |
| 6,708,357 | B2 | | 3/2004 | Gaboury et al. |
| 6,719,708 | B1 | | 4/2004 | Jansen |
| 6,763,541 | B2 | | 7/2004 | Mahoney et al. |
| 6,778,090 | B2 | | 8/2004 | Newham |
| 6,804,848 | B1 | | 10/2004 | Rose |
| 6,832,397 | B2 | | 12/2004 | Gaboury et al. |
| 6,840,117 | B2 | | 1/2005 | Hubbard, Jr. |
| 6,840,907 | B1 | | 1/2005 | Brydon |
| 6,847,301 | B1 | | 1/2005 | Olson |
| 6,878,121 | B2 | | 4/2005 | Krausman |
| 6,883,191 | B2 | | 4/2005 | Gaboury et al. |
| 6,993,380 | B1 | | 1/2006 | Modarres |
| 7,041,049 | B1 | | 5/2006 | Raniere |
| 7,077,810 | B2 | | 7/2006 | Lange et al. |
| 7,150,718 | B2 | | 12/2006 | Okada |
| 7,237,287 | B2 | | 7/2007 | Weismiller et al. |
| 7,253,366 | B2 | | 8/2007 | Bhai |
| 7,304,580 | B2 | | 12/2007 | Sullivan et al. |
| 7,314,451 | B2 | | 1/2008 | Halperin et al. |
| 7,321,811 | B1 | | 1/2008 | Rawls-Meehan |
| 7,330,127 | B2 | | 2/2008 | Price et al. |
| 7,389,554 | B1 | | 6/2008 | Rose |
| 7,396,331 | B2 | | 7/2008 | Mack |
| 7,429,247 | B2 | | 9/2008 | Okada et al. |
| 7,437,787 | B2 | | 10/2008 | Bhai |
| 7,465,280 | B2 | | 12/2008 | Rawls-Meehan |
| 7,480,951 | B2 | | 1/2009 | Weismiller |
| 7,506,390 | B2 | | 3/2009 | Dixon et al. |
| 7,520,006 | B2 | | 4/2009 | Menkedick et al. |
| 7,524,279 | B2 | | 4/2009 | Auphan |
| 7,532,934 | B2 | | 5/2009 | Lee et al. |
| 7,538,659 | B2 | | 5/2009 | Ulrich |
| 7,568,246 | B2 | | 8/2009 | Weismiller et al. |
| 7,631,377 | B1 | | 12/2009 | Sanford |
| 7,637,859 | B2 | | 12/2009 | Lindback et al. |
| 7,652,581 | B2 | | 1/2010 | Gentry et al. |
| 7,666,151 | B2 | | 2/2010 | Sullivan et al. |
| 7,669,263 | B2 | | 3/2010 | Menkedick et al. |
| 7,676,872 | B2 | | 3/2010 | Block et al. |
| 7,685,663 | B2 | | 3/2010 | Rawls-Meehan |
| 7,698,761 | B2 | | 4/2010 | Neuenswander et al. |
| 7,699,784 | B2 | | 4/2010 | Wan et al. |
| 7,717,848 | B2 | | 5/2010 | Heruth et al. |
| 7,749,154 | B2 | | 7/2010 | Cornel |
| 7,784,128 | B2 | | 8/2010 | Kramer |
| 7,785,257 | B2 | | 8/2010 | Mack et al. |
| 7,805,785 | B2 | | 10/2010 | Rawls-Meehan |
| 7,841,031 | B2 | | 11/2010 | Rawls-Meehan |
| 7,849,545 | B2 | | 12/2010 | Flocard et al. |
| 7,854,031 | B2 | | 12/2010 | Rawls-Meehan |
| 7,860,723 | B2 | | 12/2010 | Rawls-Meehan |
| 7,862,523 | B2 | | 1/2011 | Ruotoistenmaki |
| 7,865,988 | B2 | | 1/2011 | Koughan et al. |
| 7,868,757 | B2 | | 1/2011 | Radivojevic et al. |
| 7,869,903 | B2 | | 1/2011 | Turner et al. |
| 7,930,783 | B2 | | 4/2011 | Rawls-Meehan |
| 7,933,669 | B2 | | 4/2011 | Rawls-Meehan |
| 7,953,613 | B2 | | 5/2011 | Gizewski |
| 7,954,189 | B2 | | 6/2011 | Rawls-Meehan |
| 7,956,755 | B2 | | 6/2011 | Lee et al. |

(56) References Cited

U.S. PATENT DOCUMENTS

| | | | | |
|---|---|---|---|---|
| 7,967,739 | B2 | 6/2011 | Auphan | |
| 7,979,169 | B2 | 7/2011 | Rawls-Meehan | |
| 8,019,486 | B2 | 9/2011 | Rawls-Meehan | |
| 8,020,230 | B2 | 9/2011 | Rawls-Meehan | |
| 8,028,363 | B2 | 10/2011 | Rawls-Meehan | |
| 8,032,263 | B2 | 10/2011 | Rawls-Meehan | |
| 8,032,960 | B2 | 10/2011 | Rawls-Meehan | |
| 8,046,114 | B2 | 10/2011 | Rawls-Meehan | |
| 8,046,115 | B2 | 10/2011 | Rawls-Meehan | |
| 8,046,116 | B2 | 10/2011 | Rawls-Meehan | |
| 8,046,117 | B2 | 10/2011 | Rawls-Meehan | |
| 8,050,805 | B2 | 11/2011 | Rawls-Meehan | |
| 8,052,612 | B2 | 11/2011 | Tang | |
| 8,065,764 | B2 | 11/2011 | Kramer | |
| 8,069,852 | B2 | 12/2011 | Burton | |
| 8,073,535 | B2 | 12/2011 | Jung et al. | |
| 8,078,269 | B2 | 12/2011 | Suzuki et al. | |
| 8,078,336 | B2 | 12/2011 | Rawls-Meehan | |
| 8,078,337 | B2 | 12/2011 | Rawls-Meehan | |
| 8,083,682 | B2 | 12/2011 | Dalal et al. | |
| 8,090,478 | B2 | 1/2012 | Skinner et al. | |
| 8,092,399 | B2 | 1/2012 | Sasaki | |
| 8,094,013 | B1 | 1/2012 | Lee | |
| 8,096,960 | B2 | 1/2012 | Loree et al. | |
| 8,146,191 | B2 | 4/2012 | Bobey et al. | |
| 8,150,562 | B2 | 4/2012 | Rawls-Meehan | |
| 8,166,589 | B2 | 5/2012 | Hijlkema | |
| 8,181,296 | B2 | 5/2012 | Rawls-Meehan | |
| 8,266,742 | B2 | 9/2012 | Andrienko | |
| 8,272,892 | B2 | 9/2012 | McNeely et al. | |
| 8,276,585 | B2 | 10/2012 | Buckley | |
| 8,279,057 | B2 | 10/2012 | Hirose | |
| 8,280,748 | B2 | 10/2012 | Allen | |
| 8,281,433 | B2 * | 10/2012 | Riley ..................... | A61B 5/024<br>5/616 |
| 8,282,452 | B2 | 10/2012 | Grigsby et al. | |
| 8,284,047 | B2 | 10/2012 | Collins, Jr. | |
| 8,287,452 | B2 | 10/2012 | Young et al. | |
| 8,336,369 | B2 | 12/2012 | Mahoney | |
| 8,341,784 | B2 | 1/2013 | Scott | |
| 8,341,786 | B2 | 1/2013 | Oexman et al. | |
| 8,348,840 | B2 | 1/2013 | Heit et al. | |
| 8,350,709 | B2 | 1/2013 | Receveur | |
| 8,375,488 | B2 * | 2/2013 | Rawls-Meehan ...... | A61G 7/015<br>5/617 |
| 8,376,954 | B2 | 2/2013 | Lange et al. | |
| 8,382,484 | B2 | 2/2013 | Wetmore et al. | |
| 8,386,008 | B2 | 2/2013 | Yuen et al. | |
| 8,398,538 | B2 * | 3/2013 | Dothie ................. | A61B 5/4815<br>600/26 |
| 8,403,865 | B2 | 3/2013 | Halperin et al. | |
| 8,413,274 | B2 | 4/2013 | Weismiller et al. | |
| 8,421,606 | B2 | 4/2013 | Collins, Jr. et al. | |
| 8,428,696 | B2 | 4/2013 | Foo | |
| 8,444,558 | B2 | 5/2013 | Young et al. | |
| 8,620,615 | B2 * | 12/2013 | Oexman .............. | A47C 31/123<br>702/139 |
| 8,672,853 | B2 | 3/2014 | Young | |
| 8,682,457 | B2 | 3/2014 | Rawls-Meehan | |
| 8,769,747 | B2 | 7/2014 | Mahoney et al. | |
| 8,909,357 | B2 * | 12/2014 | Rawls-Meehan .... | A47C 21/003<br>700/275 |
| 8,931,329 | B2 | 1/2015 | Mahoney et al. | |
| 8,966,689 | B2 | 3/2015 | McGuire et al. | |
| 8,973,183 | B1 | 3/2015 | Palashewski et al. | |
| 8,984,687 | B2 | 3/2015 | Stusynski et al. | |
| 9,370,457 | B2 | 6/2016 | Nunn et al. | |
| 9,392,879 | B2 | 7/2016 | Nunn et al. | |
| 9,445,751 | B2 * | 9/2016 | Young ................... | A61B 5/1117 |
| 9,504,416 | B2 | 11/2016 | Young et al. | |
| 9,510,688 | B2 | 12/2016 | Nunn et al. | |
| 9,635,953 | B2 | 5/2017 | Nunn et al. | |
| 9,730,524 | B2 * | 8/2017 | Chen .................... | A47C 27/082 |
| 9,737,154 | B2 | 8/2017 | Mahoney et al. | |
| 9,770,114 | B2 * | 9/2017 | Brosnan ............... | A47C 27/081 |
| 9,844,275 | B2 * | 12/2017 | Nunn ..................... | A47C 21/04 |
| 9,931,085 | B2 | 4/2018 | Young et al. | |
| 10,092,242 | B2 | 10/2018 | Nunn et al. | |
| 10,143,312 | B2 | 12/2018 | Brosnan et al. | |
| 10,149,549 | B2 | 12/2018 | Erko et al. | |
| 10,182,661 | B2 | 1/2019 | Nunn et al. | |
| 10,201,234 | B2 | 2/2019 | Nunn et al. | |
| 10,251,490 | B2 | 4/2019 | Nunn et al. | |
| 10,342,358 | B1 | 7/2019 | Palashewski et al. | |
| 10,441,086 | B2 | 10/2019 | Nunn et al. | |
| 10,441,087 | B2 | 10/2019 | Karschnik et al. | |
| 10,448,749 | B2 | 10/2019 | Palashewski et al. | |
| 10,646,050 | B2 | 5/2020 | Nunn et al. | |
| 10,674,832 | B2 | 6/2020 | Brosnan et al. | |
| 10,716,512 | B2 | 7/2020 | Erko et al. | |
| 10,729,255 | B2 | 8/2020 | Erko et al. | |
| 10,736,432 | B2 | 8/2020 | Brosnan et al. | |
| 10,750,875 | B2 | 8/2020 | Palashewski et al. | |
| 10,827,846 | B2 | 11/2020 | Karschnik et al. | |
| 10,881,219 | B2 | 1/2021 | Nunn et al. | |
| 10,957,335 | B2 | 3/2021 | Demirli et al. | |
| 10,959,535 | B2 | 3/2021 | Karschnik et al. | |
| D916,745 | S | 4/2021 | Stusynski et al. | |
| 10,980,351 | B2 | 4/2021 | Nunn et al. | |
| 11,122,909 | B2 | 9/2021 | Palashewski et al. | |
| 11,160,683 | B2 | 11/2021 | Nunn et al. | |
| 11,206,929 | B2 | 12/2021 | Palashewski et al. | |
| D954,725 | S | 6/2022 | Stusynski et al. | |
| D968,436 | S | 11/2022 | Stusynski et al. | |
| D975,121 | S | 1/2023 | Stusynski et al. | |
| 2002/0014951 | A1 * | 2/2002 | Kramer .................. | G16H 10/60<br>340/286.07 |
| 2002/0124311 | A1 | 9/2002 | Peftoulidis | |
| 2002/0184711 | A1 * | 12/2002 | Mahoney ............. | A47C 27/083<br>5/904 |
| 2002/0189621 | A1 | 12/2002 | Ek | |
| 2003/0045806 | A1 | 3/2003 | Brydon | |
| 2003/0128125 | A1 | 6/2003 | Burbank et al. | |
| 2003/0163874 | A1 | 9/2003 | Boso et al. | |
| 2003/0166995 | A1 | 9/2003 | Jansen | |
| 2003/0182728 | A1 | 10/2003 | Chapman et al. | |
| 2003/0221261 | A1 | 12/2003 | Tarbet et al. | |
| 2004/0049132 | A1 | 3/2004 | Barron et al. | |
| 2005/0022606 | A1 | 2/2005 | Partin et al. | |
| 2005/0038326 | A1 | 2/2005 | Mathur | |
| 2005/0115561 | A1 | 6/2005 | Stahmann et al. | |
| 2005/0190065 | A1 | 9/2005 | Ronnholm | |
| 2005/0190068 | A1 | 9/2005 | Gentry et al. | |
| 2005/0283039 | A1 | 12/2005 | Cornel | |
| 2006/0020178 | A1 | 1/2006 | Sotos et al. | |
| 2006/0031996 | A1 | 2/2006 | Rawls-Meehan | |
| 2006/0047217 | A1 | 3/2006 | Mirtalebi | |
| 2006/0152378 | A1 | 7/2006 | Lokhorst | |
| 2006/0162074 | A1 | 7/2006 | Bader | |
| 2007/0049842 | A1 | 3/2007 | Hill et al. | |
| 2007/0118054 | A1 | 5/2007 | Pinhas et al. | |
| 2007/0149883 | A1 | 6/2007 | Yesha | |
| 2007/0179334 | A1 | 8/2007 | Groves et al. | |
| 2007/0180047 | A1 | 8/2007 | Dong et al. | |
| 2007/0180618 | A1 | 8/2007 | Weismiller et al. | |
| 2007/0276202 | A1 | 11/2007 | Raisanen et al. | |
| 2008/0052830 | A1 | 3/2008 | Koughan | |
| 2008/0052837 | A1 | 3/2008 | Blumberg | |
| 2008/0071200 | A1 | 3/2008 | Rawls-Meehan | |
| 2008/0077020 | A1 | 3/2008 | Young et al. | |
| 2008/0092291 | A1 | 4/2008 | Rawls-Meehan | |
| 2008/0092292 | A1 | 4/2008 | Rawls-Meehan | |
| 2008/0092293 | A1 | 4/2008 | Rawls-Meehan | |
| 2008/0092294 | A1 | 4/2008 | Rawls-Meehan | |
| 2008/0093784 | A1 | 4/2008 | Rawls-Meehan | |
| 2008/0097774 | A1 | 4/2008 | Rawls-Meehan | |
| 2008/0097778 | A1 | 4/2008 | Rawls-Meehan | |
| 2008/0097779 | A1 | 4/2008 | Rawls-Meehan | |
| 2008/0104750 | A1 | 5/2008 | Rawls-Meehan | |
| 2008/0104754 | A1 | 5/2008 | Rawls-Meehan | |
| 2008/0104755 | A1 | 5/2008 | Rawls-Meehan | |
| 2008/0104756 | A1 | 5/2008 | Rawls-Meehan | |
| 2008/0104757 | A1 | 5/2008 | Rawls-Meehan | |

(56) References Cited

U.S. PATENT DOCUMENTS

2008/0104758 A1 5/2008 Rawls-Meehan
2008/0104759 A1 5/2008 Rawls-Meehan
2008/0104760 A1 5/2008 Rawls-Meehan
2008/0104761 A1 5/2008 Rawls-Meehan
2008/0109959 A1 5/2008 Rawls-Meehan
2008/0109964 A1 5/2008 Flocard et al.
2008/0109965 A1 5/2008 Mossbeck
2008/0115272 A1 5/2008 Rawls-Meehan
2008/0115273 A1 5/2008 Rawls-Meehan
2008/0115274 A1 5/2008 Rawls-Meehan
2008/0115275 A1 5/2008 Rawls-Meehan
2008/0115276 A1 5/2008 Rawls-Meehan
2008/0115277 A1 5/2008 Rawls-Meehan
2008/0115278 A1 5/2008 Rawls-Meehan
2008/0115279 A1 5/2008 Rawls-Meehan
2008/0115280 A1 5/2008 Rawls-Meehan
2008/0115281 A1 5/2008 Rawls-Meehan
2008/0115282 A1 5/2008 Rawls-Meehan
2008/0120775 A1 5/2008 Rawls-Meehan
2008/0120776 A1 5/2008 Rawls-Meehan
2008/0120777 A1 5/2008 Rawls-Meehan
2008/0120778 A1 5/2008 Rawls-Meehan
2008/0120779 A1 5/2008 Rawls-Meehan
2008/0120784 A1 5/2008 Warner et al.
2008/0122616 A1 5/2008 Warner
2008/0126122 A1 5/2008 Warner et al.
2008/0126132 A1 5/2008 Warner
2008/0127418 A1 6/2008 Rawls-Meehan
2008/0127424 A1 6/2008 Rawls-Meehan
2008/0147442 A1 6/2008 Warner
2008/0162171 A1 7/2008 Rawls-Meehan
2008/0262657 A1* 10/2008 Howell ................ A47C 20/041 700/275
2008/0275314 A1 11/2008 Mack et al.
2008/0281611 A1 11/2008 Rawls-Meehan
2008/0281612 A1 11/2008 Rawls-Meehan
2008/0281613 A1 11/2008 Rawls-Meehan
2008/0288272 A1 11/2008 Rawls-Meehan
2008/0288273 A1 11/2008 Rawls-Meehan
2008/0306351 A1 12/2008 Izumi
2008/0307582 A1 12/2008 Flocard et al.
2009/0018853 A1 1/2009 Rawls-Meehan
2009/0018854 A1 1/2009 Rawls-Meehan
2009/0018855 A1 1/2009 Rawls-Meehan
2009/0018856 A1 1/2009 Rawls-Meehan
2009/0018857 A1 1/2009 Rawls-Meehan
2009/0018858 A1 1/2009 Rawls-Meehan
2009/0024406 A1 1/2009 Rawls-Meehan
2009/0037205 A1 2/2009 Rawls-Meehan
2009/0043595 A1 2/2009 Rawls-Meehan
2009/0064420 A1 3/2009 Rawls-Meehan
2009/0100599 A1 4/2009 Rawls-Meehan
2009/0121660 A1 5/2009 Rawls-Meehan
2009/0139029 A1 6/2009 Rawls-Meehan
2009/0203972 A1 8/2009 Henehgan et al.
2009/0275808 A1 11/2009 DiMaio et al.
2009/0314354 A1 12/2009 Chaffee
2010/0025900 A1 2/2010 Rawls-Meehan
2010/0090383 A1 4/2010 Rawls-Meehan
2010/0094139 A1 4/2010 Brauers et al.
2010/0099954 A1 4/2010 Dickinson et al.
2010/0152546 A1 6/2010 Behan et al.
2010/0170043 A1 7/2010 Young et al.
2010/0170044 A1 7/2010 Kao et al.
2010/0174198 A1 7/2010 Young et al.
2010/0174199 A1 7/2010 Young et al.
2010/0191136 A1 7/2010 Wolford
2010/0199432 A1 8/2010 Rawls-Meehan
2010/0231421 A1 9/2010 Rawls-Meehan
2010/0302044 A1 12/2010 Chacon et al.
2010/0317930 A1 12/2010 Oexman et al.
2011/0001622 A1 1/2011 Gentry
2011/0010014 A1 1/2011 Oexman et al.
2011/0015495 A1 1/2011 Dothie et al.
2011/0041592 A1 2/2011 Schmoeller et al.
2011/0068935 A1 3/2011 Riley et al.
2011/0087113 A1 4/2011 Mack et al.
2011/0094041 A1 4/2011 Rawls-Meehan
2011/0115635 A1 5/2011 Petrovski et al.
2011/0138539 A1 6/2011 Mahoney et al.
2011/0144455 A1 6/2011 Young et al.
2011/0156915 A1 6/2011 Brauers et al.
2011/0224510 A1 9/2011 Oakhill
2011/0239374 A1 10/2011 Rawls-Meehan
2011/0252569 A1 10/2011 Rawls-Meehan
2011/0258784 A1 10/2011 Rawls-Meehan
2011/0282216 A1 11/2011 Shinar et al.
2011/0283462 A1 11/2011 Rawls-Meehan
2011/0291795 A1 12/2011 Rawls-Meehan
2011/0291842 A1 12/2011 Oexman
2011/0295083 A1 12/2011 Doelling et al.
2011/0302720 A1 12/2011 Yakam et al.
2011/0306844 A1 12/2011 Young
2012/0017371 A1 1/2012 Pollard
2012/0025992 A1 2/2012 Tallent et al.
2012/0053423 A1 3/2012 Kenalty et al.
2012/0053424 A1 3/2012 Kenalty et al.
2012/0056729 A1 3/2012 Rawls-Meehan
2012/0057685 A1 3/2012 Rawls-Meehan
2012/0090698 A1 4/2012 Giori et al.
2012/0110738 A1 5/2012 Rawls-Meehan
2012/0110739 A1 5/2012 Rawls-Meehan
2012/0110740 A1 5/2012 Rawls-Meehan
2012/0112890 A1 5/2012 Rawls-Meehan
2012/0112891 A1 5/2012 Rawls-Meehan
2012/0112892 A1 5/2012 Rawls-Meehan
2012/0116591 A1 5/2012 Rawls-Meehan
2012/0119886 A1 5/2012 Rawls-Meehan
2012/0119887 A1 5/2012 Rawls-Meehan
2012/0138067 A1 6/2012 Rawls-Meehan
2012/0154155 A1 6/2012 Brasch
2012/0167311 A1* 7/2012 Lee ........................ A47C 17/86 5/694
2012/0186019 A1 7/2012 Rawls-Meehan
2012/0198632 A1 8/2012 Rawls-Meehan
2012/0204887 A1 8/2012 Connor
2012/0216348 A1* 8/2012 Cox ....................... A61G 7/018 5/503.1
2012/0240340 A1 9/2012 Driscoll et al.
2012/0304391 A1 12/2012 Driscoll et al.
2012/0311790 A1 12/2012 Nomura et al.
2013/0160212 A1 6/2013 Oexman et al.
2013/0174347 A1 7/2013 Oexman et al.
2013/0227787 A1 9/2013 Herbst et al.
2014/0007656 A1 1/2014 Mahoney
2014/0047644 A1 2/2014 Mossbeck
2014/0137332 A1 5/2014 McGuire et al.
2014/0182061 A1 7/2014 Zaiss
2014/0250597 A1 9/2014 Chen et al.
2014/0257571 A1 9/2014 Chen et al.
2014/0259417 A1 9/2014 Nunn et al.
2014/0259418 A1 9/2014 Nunn et al.
2014/0259419 A1 9/2014 Stusynski et al.
2014/0259431 A1 9/2014 Fleury
2014/0259433 A1 9/2014 Nunn et al.
2014/0259434 A1 9/2014 Nunn et al.
2014/0277611 A1 9/2014 Nunn et al.
2014/0277778 A1 9/2014 Nunn et al.
2014/0277822 A1 9/2014 Nunn et al.
2014/0313700 A1 10/2014 Connell et al.
2015/0007393 A1 1/2015 Palashewski
2015/0025327 A1 1/2015 Young et al.
2015/0026896 A1 1/2015 Fleury et al.
2015/0136146 A1 5/2015 Hood et al.
2015/0157137 A1 6/2015 Nunn et al.
2015/0157519 A1 6/2015 Stusynski et al.
2015/0182033 A1 7/2015 Brosnan et al.
2015/0182397 A1 7/2015 Palashewski et al.
2015/0182399 A1 7/2015 Palashewski et al.
2015/0182418 A1 7/2015 Zaiss
2016/0015184 A1 1/2016 Nunn et al.
2016/0120740 A1 1/2016 Rawls-Meehan
2016/0338871 A1 11/2016 Nunn et al.
2016/0367039 A1 12/2016 Young et al.

(56) References Cited

U.S. PATENT DOCUMENTS

| | | | |
|---|---|---|---|
| 2017/0065220 | A1 | 3/2017 | Young et al. |
| 2017/0112716 | A1 | 4/2017 | Rawls-Meehan |
| 2017/0128001 | A1 | 5/2017 | Torre et al. |
| 2017/0143269 | A1 | 5/2017 | Young et al. |
| 2019/0053761 | A1 | 2/2019 | Torre et al. |
| 2019/0069840 | A1 | 3/2019 | Young et al. |
| 2019/0200777 | A1 | 7/2019 | Demirli et al. |
| 2019/0201265 | A1 | 7/2019 | Sayadi et al. |
| 2019/0201266 | A1 | 7/2019 | Sayadi et al. |
| 2019/0201267 | A1 | 7/2019 | Demirli et al. |
| 2019/0201268 | A1 | 7/2019 | Sayadi et al. |
| 2019/0201270 | A1 | 7/2019 | Sayadi et al. |
| 2019/0201271 | A1 | 7/2019 | Grey et al. |
| 2019/0328146 | A1 | 10/2019 | Palashewski et al. |
| 2019/0328147 | A1 | 10/2019 | Palashewski et al. |
| 2019/0357696 | A1 | 11/2019 | Palashewski et al. |
| 2020/0297126 | A1 | 9/2020 | Palashewski et al. |
| 2020/0315367 | A1 | 10/2020 | Demirli et al. |
| 2020/0336010 | A1 | 10/2020 | Holmvik et al. |
| 2020/0337470 | A1 | 10/2020 | Sayadi et al. |
| 2020/0359807 | A1 | 11/2020 | Brosnan et al. |
| 2020/0367663 | A1 | 11/2020 | Nunn et al. |
| 2020/0405070 | A1 | 12/2020 | Palashewski et al. |
| 2020/0405240 | A1 | 12/2020 | Palashewski et al. |
| 2021/0000261 | A1 | 1/2021 | Erko et al. |
| 2021/0034989 | A1 | 2/2021 | Palashewski et al. |
| 2021/0045541 | A1 | 2/2021 | Nunn et al. |
| 2021/0068552 | A1 | 3/2021 | Palashewski et al. |
| 2021/0112992 | A1 | 4/2021 | Nunn et al. |
| 2021/0267380 | A1 | 9/2021 | Stusynski |
| 2021/0282570 | A1 | 9/2021 | Karschnik et al. |
| 2021/0289947 | A1 | 9/2021 | Karschnik et al. |
| 2021/0314405 | A1 | 10/2021 | Demirli et al. |
| 2022/0000273 | A1 | 1/2022 | Palashewski et al. |
| 2022/0000654 | A1 | 1/2022 | Nunn et al. |
| 2022/0225786 | A1 | 7/2022 | Palashewski et al. |
| 2022/0265059 | A1 | 8/2022 | Palashewski et al. |
| 2022/0305231 | A1 | 9/2022 | Stusynski et al. |
| 2022/0346565 | A1 | 11/2022 | Karschnik et al. |
| 2022/0354431 | A1 | 11/2022 | Molina et al. |
| 2022/0386947 | A1 | 12/2022 | Molina et al. |
| 2022/0395233 | A1 | 12/2022 | Siyahjani et al. |
| 2023/0018558 | A1 | 1/2023 | Demirli et al. |
| 2023/0035257 | A1 | 2/2023 | Karschnik et al. |
| 2023/0037482 | A1 | 2/2023 | Demirli et al. |
| 2023/0054736 | A1 | 2/2023 | Holmvik et al. |
| 2023/0063373 | A1 | 3/2023 | Young et al. |
| 2023/0142604 | A1 | 5/2023 | Dixon et al. |
| 2023/0148762 | A1 | 5/2023 | Karschnik et al. |
| 2023/0181104 | A1 | 6/2023 | Johnston et al. |
| 2023/0190199 | A1 | 6/2023 | Molina |
| 2023/0210256 | A1 | 7/2023 | MacLachlan et al. |
| 2023/0210268 | A1 | 7/2023 | Kirk et al. |
| 2023/0210269 | A1 | 7/2023 | Hill et al. |
| 2023/0210274 | A1 | 7/2023 | Hill et al. |
| 2023/0210275 | A1 | 7/2023 | Hill et al. |
| 2023/0218093 | A1 | 7/2023 | Nunn et al. |

FOREIGN PATENT DOCUMENTS

| | | |
|---|---|---|
| CN | 202605093 | 12/2012 |
| CN | 102846420 | 1/2013 |
| DE | 4005822 | 8/1991 |
| GB | 2471401 | 12/2010 |
| JP | 2002-503504 | 2/2002 |
| JP | 2004-229875 | 8/2004 |
| JP | 2004-255138 | 9/2004 |
| WO | WO 2004/082549 | 9/2004 |
| WO | WO 2008/023724 | 2/2008 |
| WO | WO 2008/128250 | 10/2008 |
| WO | WO 2009/108228 | 9/2009 |
| WO | WO 2009/123641 | 10/2009 |
| WO | WO 2010/149788 | 12/2010 |

OTHER PUBLICATIONS

U.S. Appl. No. 17/091,094, filed Nov. 6, 2020, Karschnik et al.
U.S. Appl. No. 17/189,618, filed Mar. 2, 2021, Stusynski.
U.S. Appl. No. 17/207,149, filed Mar. 19, 2021, Demirli et al.
U.S. Appl. No. 17/216,297, filed Mar. 29, 2021, Karschnik et al.
U.S. Appl. No. 17/745,508, filed May 16, 2022, Nunn et al.
U.S. Appl. No. 18/105,468, filed Feb. 3, 2023, Sayadi et al.
U.S. Appl. No. 18/135,448, filed Apr. 17, 2023, Demirli et al.
U.S. Appl. No. 18/199,255, filed May 18, 2023, Sayadi et al.
U.S. Appl. No. 18/199,750, filed May 19, 2023, Sayadi et al.
U.S. Appl. No. 18/204,141, filed May 31, 2023, Palashewski et al.
U.S. Appl. No. 18/221,056, filed Jul. 12, 2023, Grey et al.
U.S. Appl. No. 18/224,365, filed Jul. 20, 2023, Blomseth et al.
U.S. Appl. No. 18/224,899, filed Jul. 21, 2023, Brosnan et al.
U.S. Appl. No. 18/234,676, filed Aug. 16, 2023, Nunn et al.
U.S. Appl. No. 18/333,861, filed Jun. 13, 2023, Stusynski et al.
U.S. Appl. No. 29/676,117, filed Jan. 8, 2019, Stusynski et al.
U.S. Appl. No. 29/776,258, filed Mar. 29, 2021, Stusynski et al.
U.S. Appl. No. 29/777,084, filed Apr. 2, 2021, Stusynski et al.
U.S. Appl. No. 29/814,835, filed Nov. 9, 2021, Dixon et al.
U.S. Appl. No. 29/837,293, filed May 4, 2022, Stusynski et al.
U.S. Appl. No. 29/881,955, filed Jan. 9, 2023, Stusynski et al.
U.S. Appl. No. 29/910,800, filed Aug. 24, 2023, Stusynski et al.
PCT International Preliminary Report on Patentability and Written Opinion in International Appln. No. PCT/US2014/026347, dated Sep. 15, 2015, 8 pages.
PCT International Preliminary Report on Patentability and Written Opinion in International Appln. No. PCT/US2014/026526, dated Sep. 24, 2015, 6 pages.
PCT International Preliminary Report on Patentability and Written Opinion in International Appln. No. PCT/US2014/026568, dated Sep. 24, 2015, 6 pages.
PCT International Preliminary Report on Patentability and Written Opinion in International Appln. No. PCT/US2014/027752, dated Sep. 15, 2015, 6 pages.
PCT International Preliminary Report on Patentability and Written Opinion in International Appln. No. PCT/US2014/028137, dated Sep. 24, 2015, 6 pages.
PCT International Search Report and Written Opinion in International Appln. No. PCT/US2014/024891, dated May 15, 2014, 8 pages.
PCT International Search Report and Written Opinion in International Appln. No. PCT/US2014/026288, dated May 15, 2014, 8 pages.
PCT International Search Report and Written Opinion in International Appln. No. PCT/US2014/026526, dated May 15, 2014, 7 pages.
PCT International Search Report and Written Opinion in International Appln. No. PCT/US2014/027752, dated Jul. 15, 2014, 5 pages.
PCT International Search Report in International Appln. No. PCT/US2014/026347, dated Jun. 27, 2014, 6 pages.
PCT International Search Report in International Appln. No. PCT/US2014/026390, dated May 26, 2014, 4 pages.
PCT International Search Report in International Appln. No. PCT/US2014/026568, dated May 26, 2014, 3 pages.
PCT International Search Report in International Appln. No. PCT/US2014/028137, dated Jul. 7, 2014, 2 pages.

* cited by examiner

CONTROLLING DEVICE FOR ADJUSTABLE BED FOUNDATION

CROSS-REFERENCE TO RELATED APPLICATIONS

This application is a continuation application of U.S. application Ser. No. 17/379,460, filed on Jul. 19, 2021, which is a continuation application of U.S. application Ser. No. 16/698,393, filed Nov. 27, 20219, now U.S. Pat. No. 11,096,849, which is a continuation of U.S. application Ser. No. 16/109,970, filed Aug. 23, 2018, now U.S. Pat. No. 10,492,969, which is a continuation application of U.S. application Ser. No. 14/624,305, filed Feb. 17, 2015, now U.S. Pat. No. 10,058,467, which is a continuation application of U.S. application Ser. No. 13/803,671, filed on Mar. 14, 2013, now U.S. Pat. No. 8,984,687, the entire contents of which is hereby incorporated by reference.

BACKGROUND

Snoring can disturb another person who is sleeping in the same room. Snoring can be particularly disturbing if the snorer and the other person are attempting to sleep on the same bed, such as a married couple where one spouse snores. Some people deal with the problem by waking the snorer up in order to stop the snoring. However, the snorer often begins snoring again after going back to sleep. Moreover, waking the snorer interrupts the snorers sleep as well.

SUMMARY

The present disclosure is directed to a sleep system and method that allows a first occupant on an adjustable bed to select a position for an opposite side of the bed. For example, if a second occupant on the opposite side of the bed is snoring, the first occupant can control the opposite side to move into a snore-reducing position. The first occupant can activate the snore-reducing position without having to wake the second occupant. The ability to control the position of the opposite side of the bed can be incorporated into a remote control or other controlling device that is accessible by the first occupant so that the second occupant's side of the bed can be actuated by the first occupant's remote control or other controlling device. This feature can allow the first occupant to reduce or eliminate the second occupant's snoring easily without the first occupant having to wake the second occupant and disturb his or her sleep.

The present disclosure describes a sleep system comprising at least one mattress including a first sleep area for a first occupant, the first sleep area including a first section for a portion of a body of the first occupant, and a second sleep area adjacent to the first sleep area for a second occupant, the second sleep area including a second section for a portion of a body of the second occupant, an articulation system for articulating the first section and the second section, a first user controller configured to communicate with the articulation system in order to control articulation of the first section, and a second user controller configured to communicate with the articulation system in order to control articulation of the second section, wherein the first user controller is further configured to communicate with the articulation system in order to move the second section into a predetermined position.

The present disclosure also describes a sleep system, comprising a support frame, at least one mattress configured to be positioned on the support frame, the at least one mattress including, a first sleep area for a first occupant, the first sleep area including an articulable first head section and an articulable first leg section, and a second sleep area adjacent to the first sleep area for a second occupant, the second sleep area including an articulable second head section and an articulable second leg section. The sleep system further comprises an articulation system including a first head motor for articulating the first head section, a first leg motor for articulating the first leg section, a second head motor for articulating the second head section, a second leg motor for articulating the second leg section, and at least one controller for controlling the first head motor, the first leg motor, the second head motor, and the second leg motor. The sleep system also includes a first user controller configured to communicate with the at least one controller via a first communication link in order to control articulation of the first head section to a plurality of positions and to control the first leg section to a plurality of positions and a second user controller configured to communicate with the at least one controller via a second communication link in order to control articulation of the second head section to a plurality of positions and to control the second leg section to a plurality of positions. The first user controller is further configured to communicate with the at least one controller in order to move the second head section to a predetermined position.

The present disclosure further describes a method for controlling an articulating bed, the method comprising sending a first movement control signal from a first user controlling device to one or more controllers, wherein the first movement control signal comprises one or more commands to move a first sleep area to any of a plurality of positions, sending a first motor control signal, triggered by the first movement control signal, from the one or more controllers to a first set of one or more articulating motors, moving the first sleep area to one of the plurality of positions according to the first motor control signal with the first set of one or more articulating motors, sending a second movement control signal from the first user controlling device to the one or more controllers, wherein the second movement control signal comprises one or more commands to move a second sleep area to a predetermined position, sending a second motor control signal, triggered by the second movement control signal, from the one or more controllers to a second set of one or more articulating motors, and moving the second sleep area to the predetermined position according to the second motor control signal with the second set of one or more articulating motors.

These and other examples and features of the present systems and methods will be set forth in part in the following Detailed Description. This Summary is intended to provide an overview of the present subject matter, and is not intended to provide an exclusive or exhaustive explanation. The Detailed Description below is included to provide further information about the present systems and methods.

DETAILED DESCRIPTION

This disclosure describes a sleep system including an adjustable bed configured for two occupants to share. The adjustable bed can be configured so that each side of the bed can be independently adjusted by each occupant of the bed, e.g., so that each occupant can select a particular position or positions that he or she prefers. Each side of the bed can be independently controlled by a controlling device, such as a remote control, so that each occupant has individual control over their side of the bed. The sleep system can be configured so that a first occupant's remote control can control the position of one or more aspects of the second occupant's side of the bed. For example, the sleep system can be configured so that if one of the occupants begins to snore, the snoring occupant's partner can use their own remote to adjust the snoring occupant's side of the bed into a snore-reducing position.

Figure 1:
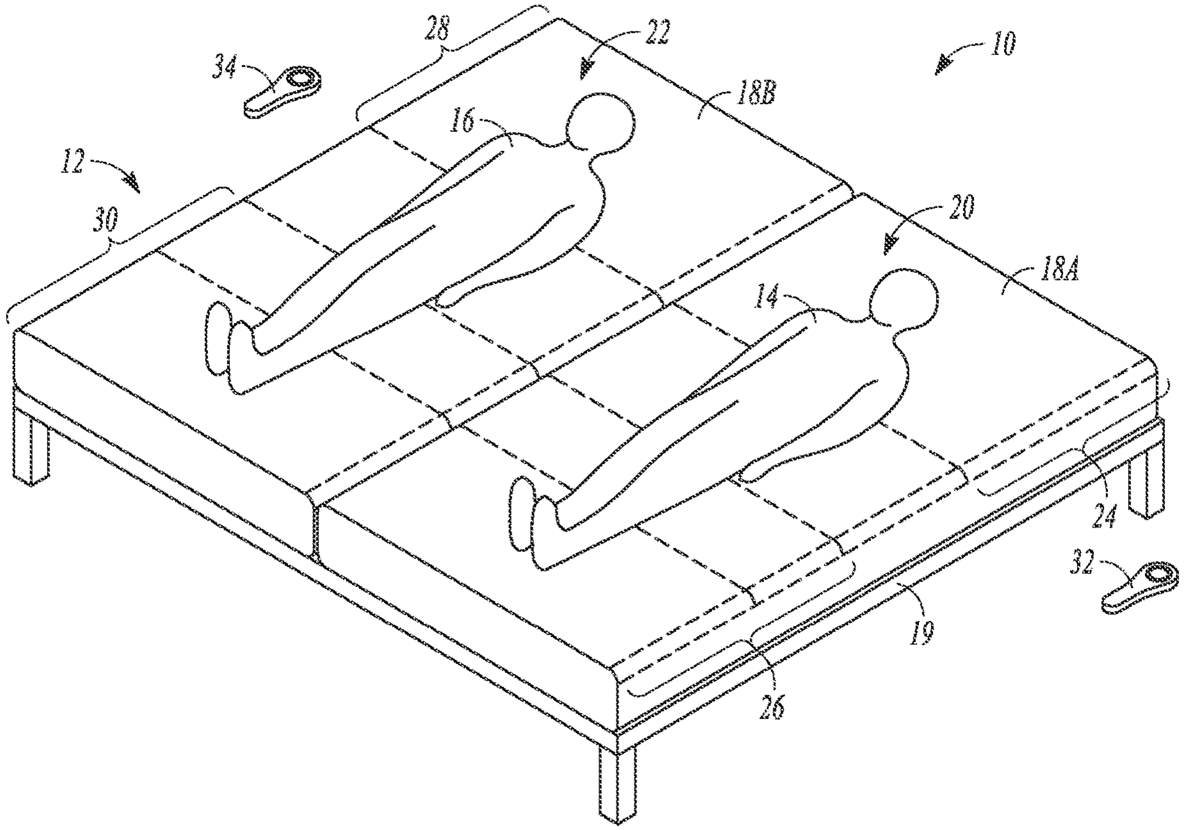
FIG. 1 is a perspective view of an example sleep system including an adjustable bed for two occupants with both sides of the bed being in a horizontal or flat position.
Figure 2:
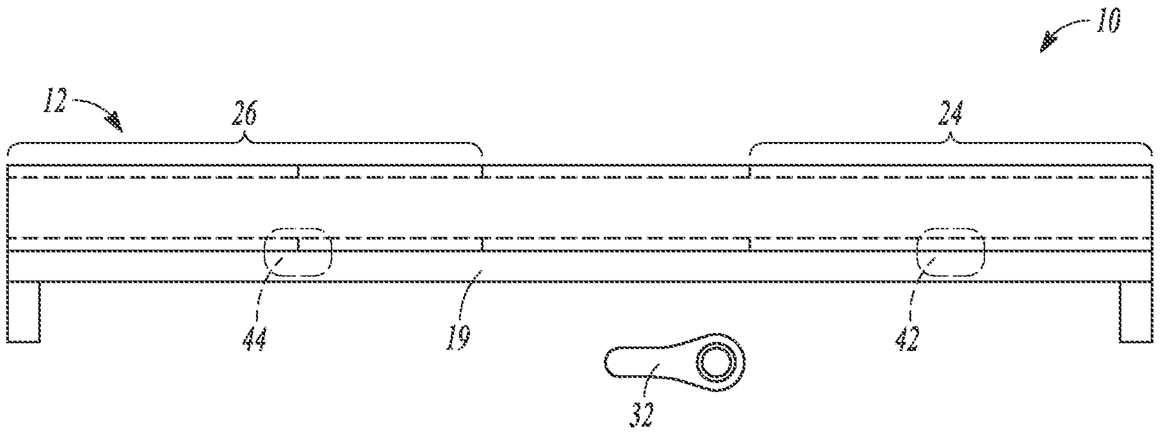
FIG. 2 is a side view of the example sleep system shown in FIG. 1.

FIGS. 1 and 2 show a perspective view and a side view, respectively, of an example sleep system 10. The sleep system 10 can include a bed 12 that is configured and intended to be used by two occupants, a first occupant 14 and a second occupant 16. The bed 12 can include one or more mattresses 18A, 18B (collectively referred to as "mattress 18" or "mattresses 18") supported by a frame 19. The occupants 14, 16 can be supported by the one or more mattresses 18. The bed 12 can include a first sleep area 20 for the first occupant 14 and a second sleep area 22 for the second occupant 16.

Each of the sleep areas 20, 22 can be movable or articulable between a plurality of positions to provide the occupants 14, 16 with the ability to select a preferred position for comfort of for a particular purpose. Each sleep area 20, 22 can include one or more articulable sections. In an example, the first sleep area 20 can include a section 24 that can be raised and lowered to adjust a position of the head or upper torso, or both, of the first occupant 14 (referred to herein as the first head section 24) and a section 26 that can be raised and lowered to adjust a position of the legs or lower torso, or both, of the first occupant 14 (referred to herein as the first leg section 26). Similarly, the second sleep area 22 can include a section 28 that can be raised and lowered to adjust a position of the head or upper torso, or both, of the second occupant 16 (referred to herein as the second head section 28) and a section 30 that can be raised and lowered to adjust a position of the legs or lower torso, or both, of the second occupant 16 (referred to herein as the second leg section 30).

Figure 3:
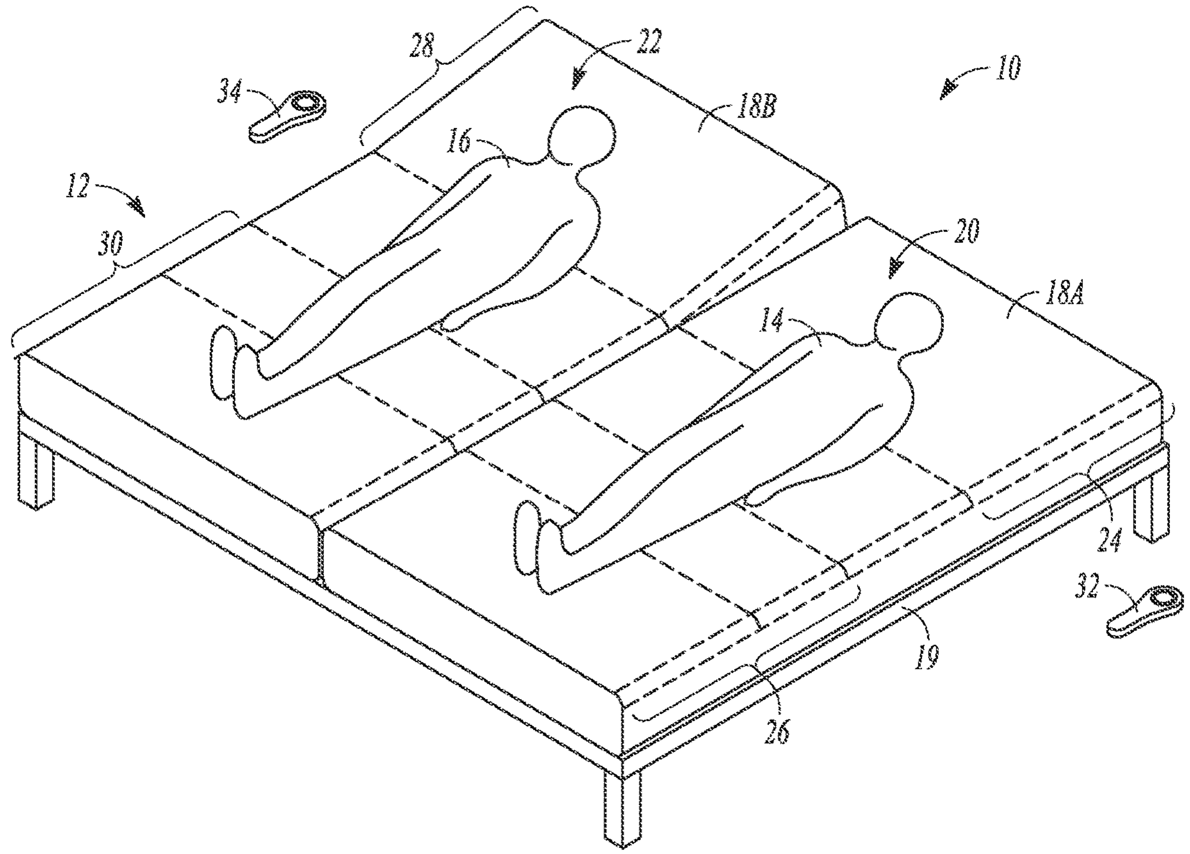
FIG. 3 is a perspective view of the example sleep system of FIGS. 1 and 2 with a head portion of one of the sides of the bed being raised into a snore-reducing position.
Figure 4:
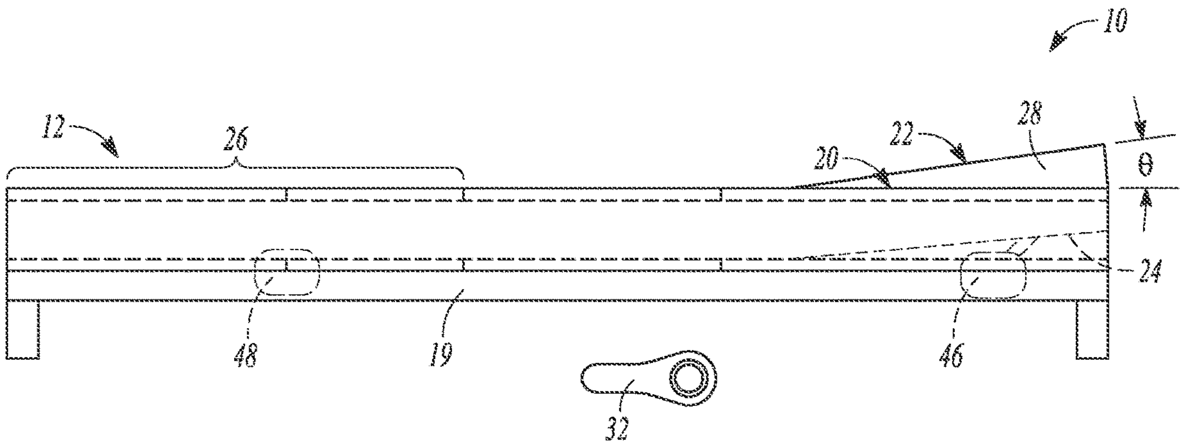
FIG. 4 is a side view of the example sleep system shown in FIG. 3.

FIGS. 3 and 4 show a perspective view and a side view, respectively, of an example configuration of the bed 12 wherein the first sleep area 20 is in a first configuration while the second sleep area 22 is in a second configuration. For example, as shown in FIGS. 3 and 4, the first sleep area 20 is in a flat configuration with the first head section 24 and the first leg section 26 being in a horizontal or substantially horizontal orientation. Thus, the first sleep area 20 is in the same or substantially the same configuration in FIGS. 3 and 4 as it is in FIGS. 1 and 2. Further, the second sleep area 22 includes at least one articulable section 28, 30 in an articulated position relative to the other section. The example configuration of the second sleep area 22 in FIGS. 3 and 4 includes the second head section 28 being elevated relative to the horizontal position (FIGS. 1 and 2). FIGS. 3 and 4 show the second sleep area 22 being arranged in a snore-reducing configuration (described in more detail below).

Examples of adjustable beds that are similar to the articulable sleep areas of the present disclosure include, but are not limited to, Sleep Number Split King or Split Queen beds, sold by Select Comfort Corp., Minneapolis, MN, or the Queen Split, California King Split, or Eastern King Split mattresses sold by Comfortaire Corp., Greenville, SC. Other sizes of split-type articulating mattress, other than queen and king size mattresses, can be used without varying from the scope of the present disclosure.

In the example best seen in FIGS. 1 and 3, the one or more mattresses 18 can comprise a pair of mattresses 18A, 18B, with a first mattress 18A making up the first sleep area 20 and a second mattress 18B making up the second sleep area 22. The use of two separate adjustable mattresses, placed adjacent to one another, is similar to the arrangement of Split King mattress, sold by Select Comfort Corporation. Alternatively, a single mattress (not shown) can be configured such that it is separated into the first sleep area 20 and the second sleep area 22. The use of a single mattress that is configured with two separate, independently adjustable sleep areas, is similar to the configuration of the elite4 Split mattresses sold by Comfortaire Corporation.

The sleep system 10 can also include a pair of user controlling devices 32, 34 to allow each occupant 14, 16 to control the articulation of his or her respective sleep area 20, 22. As shown in FIGS. 1 and 3, the sleep system 10 can include a first user controlling device 32, e.g., a first handheld remote control 32, that has been programmed to control operation of the first sleep area 20, and a second user control device 34, e.g., a second handheld remote control 34, that has been programmed to control operation of the second sleep area 22. The first occupant 14 can use the first remote control 32 to control operation of the first sleep area 20, upon which the first occupant 14 is sleeping, and the second occupant 16 can use the second remote control 34 to control operation of the second sleep area 22 upon which the second occupant 16 is sleeping. In order to ensure proper linking between each remote control 32, 34 and the corresponding sleep area 20, 22, each remote control 32, 34 can include an address or other unique identifier, for example to distinguish the first remote control 32 from the second remote control 34.

Each head section 24, 28 and each leg section 26, 30 can be independently articulated. For example, the first occupant 14 can select, via the first remote control 32, to articulate the first head section 24 upward or downward by a certain amount or to articulate the first leg section 26 upward or downward by a certain amount. In an example, the head sections 24, 28 and the leg sections 26, 30 can be independently controlled by the remote controls 32, 34, e.g., continuously or along a discrete set of positions between a minimum height or orientation and a maximum height or orientation. The head section 24, 28 and the leg section 26, 30 can be articulable from a minimum height position (e.g., flat) to a maximum height position (e.g., with the head section 24, 28 at a maximum angle with respect horizontal, such as about 60°, or with the leg section 26, 30 at a maximum angle with respect to horizontal, such as about 45°).

The sleep system 10 can also be configured so that the sleep areas 20, 22 can be positioned into one or more predetermined or preset positions. For each preset position, the head section 24, 28 and the leg section 26, 30 can be moved to predetermined positions or orientations. Examples of preset positions that can each be programmed into the sleep system 10 include, but are not limited to:

(a) a flat preset, e.g., with both the head section 24, 28 and the leg section 26, 30 being in a horizontal or substantially horizontal orientation;

(b) a "reading" preset, e.g., with the head section 24, 28 being at an elevated or angled position relative to the leg section 26, 30 to allow the occupant 14, 16 to read a book, magazine, or other written material; and (c) a "television" preset, e.g., with the head section 24, 28 being elevated or angled relative to the leg section 26, 30, which can be at a different angle relative to the "reading" preset, to allow the occupant 14, 16 to comfortably watch television.

In an example, a preset position can be a snore-reducing or snore-eliminating position. Snoring can be caused by soft tissue in the back of the mouth or the throat that relaxes during sleep. The relaxed soft tissue can partially block the snorer's airway. The snorer's body typically reacts by breathing harder, which can cause the soft tissue to vibrate and cause a snoring sound. It has been found that, in some cases, snoring can be reduced or prevented by elevating the snorer's head or torso by a small amount, which can reduce vibration of the soft tissue. The slight elevation of the snorer's body can also induce the snorer to change his or her sleeping position, which can cause the snoring to stop. Therefore, in an example, a "snore-reducing" preset can comprise the head section 24, 28 being elevated slightly relative to the leg section 26, 30 (for example, less than the "reading" preset or the "television" preset) in order to reduce or alleviate snoring by the occupant 14, 16 laying on the sleep area 20, 22 being articulated. In an example, the snore-reducing preset can include the head section 24, 28 being raised at a preset angle θ relative to horizontal, as shown with head section 28 in FIG. 4. In an example, the angle θ can be selected to reduce or eliminate vibration of soft tissue within the mouth or throat of an occupant 14, 16 in order to reduce or eliminate snoring by the occupant 14, 16. In an example, the angle θ can be from about 5° to about 15° from horizontal, such as about 7°.

Figure 5:
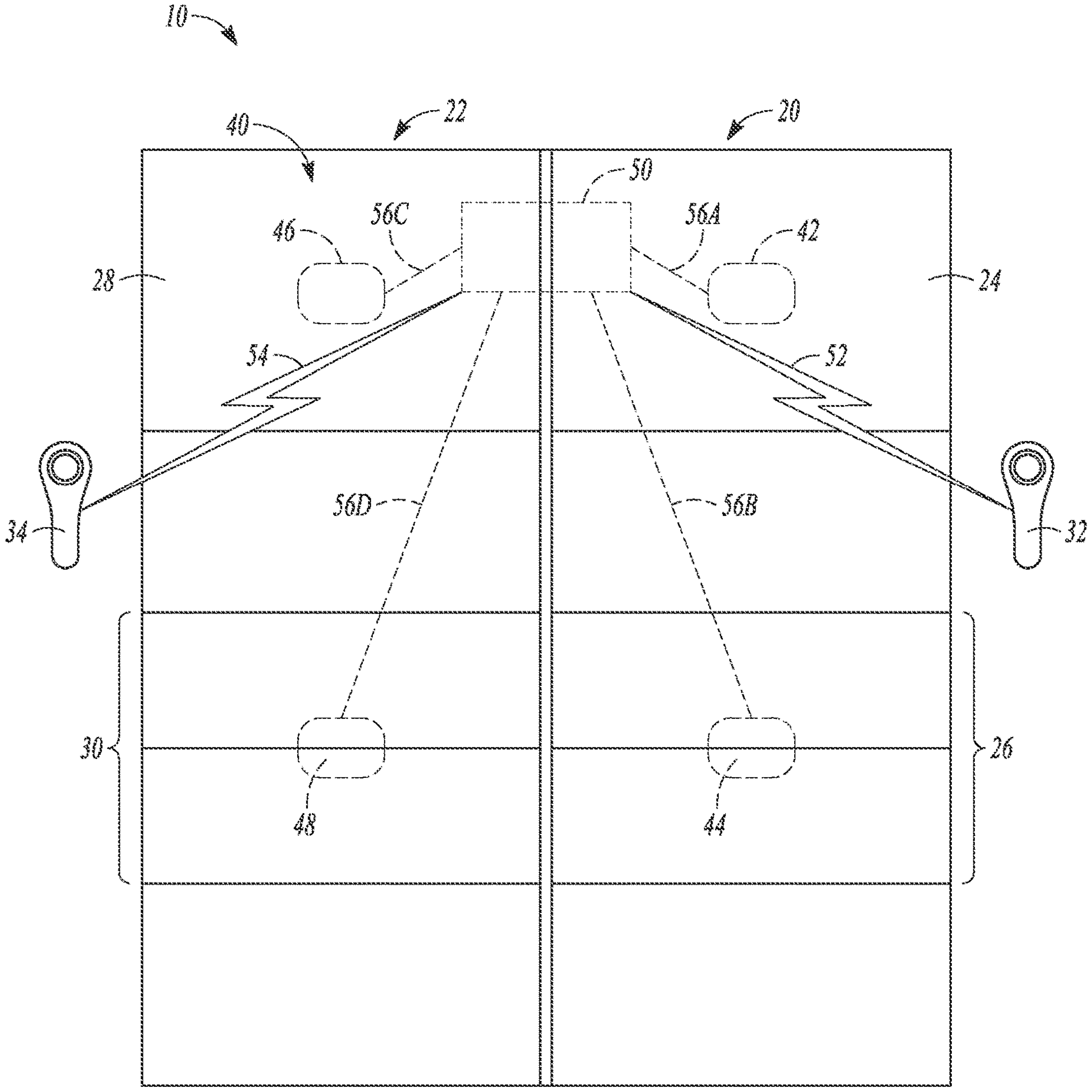
FIG. 5 is a top view of the example sleep system of FIGS. 1-4.

FIG. 5 shows a top view of the sleep system 10. As shown in FIG. 5, the sleep system 10 can include an articulation system 40 for controlling articulation of the articulable sections 24, 26, 28, 30. The articulation system 40 can include a set of articulating motors, with each articulable section being articulated by one or more of the motors. For example, a first head motor 42 can be configured to articulate the first head section 24 of the first sleep area 20. A first leg motor 44 can be configured to articulate the first leg section 26 of the first sleep area 20. A second head motor 46 can be configured to articulate the second head section 28 of the second sleep area 22. And, a second leg motor 48 can be configured to articulate the second leg section 30 of the second sleep area 22. Examples of motors that can be used for the articulating motors 42, 44, 46, 48 include, but are not limited to, bed articulating motors manufactured by Leggett & Platt, Inc., Carthage, MO, USA.

The articulation system 40 can also include one or more controllers, such as a control box that includes the electronics and hardware for providing instructions to the articulating motors 42, 44, 46, 48. FIG. 5 is a top view of the example sleep system 10, showing the articulation system 40 including a single, common controller 50 that is configured to control each of the sleep areas 20, 22, e.g., each of the articulating motors 42, 44, 46, 48. Each remote control 32, 34 can be in communication with the controller 50, such as via a wireless communication link 52, 54. The remote controls 32, 34 can send movement control signals to the controller 50 via the communication links 52, 54. A "movement control signal," as used herein, can refer to a signal or plurality of signals sent from a remote control 32, 34 to the controller 50 corresponding to a particular movement or position of one or more of the articulable sections 24, 26, 28, 30. A movement control signal can include one or more instructions for the direction of movement of a particular articulable section 24, 26, 28, 30, e.g., the direction of movement of a corresponding articulating motor 42, 44, 46, 48, a speed for the movement of a particular articulable section 24, 26, 28, 30 or of a particular articulating motor 42, 44, 46, 48, or an overall position of the corresponding sleep area 20, 22 being controlled by the remote control 32, 34, such as a preset position.

The controller 50 can send one or more motor control signals to the articulating motors 42, 44, 46, 48 corresponding to a desired motion of the articulating motors 42, 44, 46, 48. A "motor control signal," as used herein, can refer to a signal or plurality of signals sent from a controller, such as the controller 50, to one or more articulating motors 42, 44, 46, 48 corresponding to a particular movement or position of one or more articulable sections 24, 26, 28, 30. A motor control signal or signals can comprise an instruction for one or both of the direction that the articulating motor 42, 44, 46, 48 should articulate and the speed that the articulating motor 42, 44, 46, 48 should travel. In an example, a plurality of communication cables 56A, 56B, 56C, 56D (collectively referred to herein as "cable 56" or "cables 56") can carry the motor control signals from the controller 50 to the articulating motors 42, 44, 46, 48, with each cable 56 corresponding to a particular motor (such as a first cable 56A for the first head motor 42, a second cable 56B for the first leg motor 44, a third cable 56C for the second head motor 46, and a fourth cable 56D for the second foot motor 48).

In another example, a sleep system 60 can include an articulating system 62 having more than a single common controller. In the example shown in FIG. 6, each sleep area 20, 22 can have its own controller, such as a first controller 64A corresponding to the first sleep area 20 and configured to control the articulating motors 42 and 44 and a second controller 64B corresponding to the second sleep area 22 and configured to control the articulating motors 46 and 48. Each remote control 32, 34 can send movement control signals to a corresponding controller 64A, 64B, similar to the transmission of movement control signals described above with respect to a single controller 50.

The separate controllers 64A, 64B (collectively referred to herein as "controller 64" or "controllers 64") can each be in communication with one of the remote controls 32, 34 or configured to respond to the commands sent from only one of the remote controls 32, 34. For example, the first controller 64A can be linked to the first remote control 32 via a first wireless communication link 52 and the second controller 64B can be linked to the second remote control 34 via a second wireless communication link 54. Each separate controller 64 can include communication links, such as cables, to the articulating motors 42, 44, 46, 48 that are controlled by that particular controller 64. For example, the first controller 64A can be linked to the first head motor 42 via a first cable 66A and to the first leg motor 44 via a second cable 66B. Similarly, the second controller 64B can be linked to the second head motor 46 via a first cable 68A and to the second leg motor 48 via a second cable 68B. The controllers 64A and 64B can be in communication with each other via a communication link, such as a cable 69 running between the controllers 64A, 64B to pass control signals between the controllers 64A, 64B.

Figure 6:
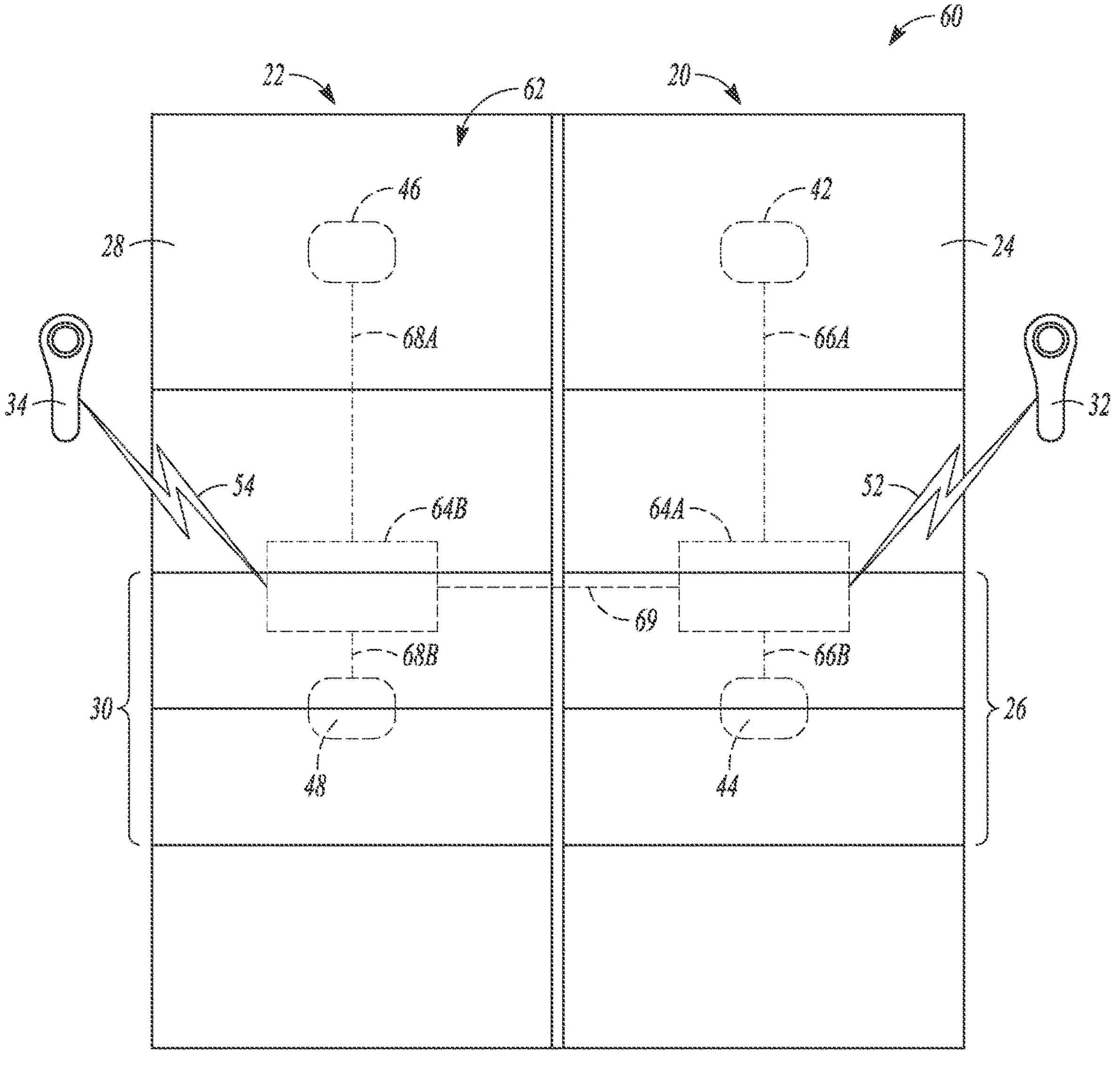
FIG. 6 is a top view of another example sleep system including an adjustable bed for two occupants.
Figure 7:
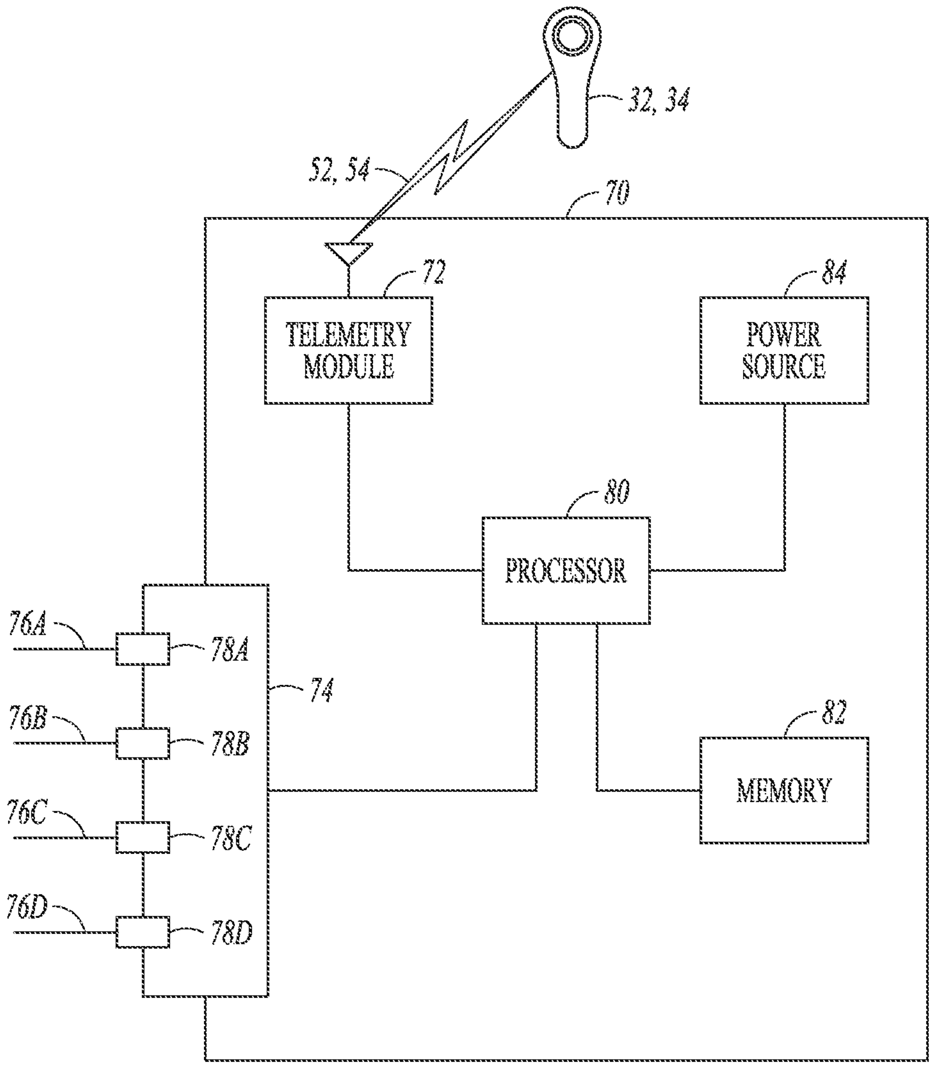
FIG. 7 is a schematic diagram of an example controller for controlling articulating motors of an adjustable sleep system.

FIG. 7 shows a schematic diagram of a controller 70, which can represent either the single controller 50 of the example sleep system 10 shown in FIG. 5 or one of the plurality of controllers 64A and 64B of the example sleep system 60 shown in FIG. 6.

The controller 70 can include communication modules to allow the controller 70 to communicate with the remote controls 32, 34 and the articulating motors 42, 44, 46, 48, such as a telemetry module 72 and a communication bus 74. The telemetry module 72 can allow for the wireless transfer of data, such as control signals, to and from one or both of the remote controls 32, 34 by establishing a wireless communication link 52, 54 between the telemetry module 72 and a similar corresponding telemetry module within each remote control 32, 34. The telemetry module 72 can include a radio frequency (RF) transceiver to permit bi-directional communication between the controller 70 and the remote controls 32, 34. To support wireless communication, such as RF communication, the telemetry module 72 can include appropriate electrical components, such as one or more of amplifiers, filters, mixers, encoders, decoders, and the like.

The communication bus 74 can provide for a physical communication link to the controller 70, such as via one or more cables 76A, 76B, 76C, 76D (collectively "cable 76" or "cables 76"), which can correspond to the cables 56 from the controller 50 in FIG. 5 or the cables 66, 68, 69 from the controllers 64A, 64B in FIG. 6. The communication bus 74 can include one or more physical ports 78A, 78B, 78C, 78D (collectively "port 78" or "ports 78"), each configured to provide for connection to a corresponding cable 76.

Each port 78 can be addressed to correspond to a particular communication link that is to be established. For example, in the case of the single controller 50 of FIG. 5, a first port 78A can be addressed to correspond to a link to the first head motor 42, a second port 78B can be addressed to correspond to a link to the first leg motor 44, a third port 78C can be addressed to correspond to a link to the second head motor 46, and a fourth port 78D can be addressed to correspond to a link to the second leg motor 48. In the example of the separate controllers 64A, 64B for each of the sleep areas 20, 22, one of the controllers 64, such as the first controller 64A, can include a first port 78A being addressed to correspond to a link to the other controller 64B, a second port 78B being addressed to correspond to a link to a corresponding head motor (such as the first head motor 42), and a third port 78C being addressed to correspond to a link to a corresponding leg motor (such as the first leg motor 44).

The controller 70 can also include a processor 80, a memory 82, and a power source 84. The processor 80 can control the overall operation of the controller 70, such as by storing and retrieving information from the memory 82, by controlling transmission of signals to and from the remote controls 32, 34 via the telemetry module 72, and controlling transmission of signals to and from the articulating motors 42, 44, 46, 48 or another controller via the communication bus 74. The processor 80 can take the form of one or more microprocessors, one or more controllers, one or more digital signal processor (DSP), one or more application-specific integrated circuit (ASIC), one or more field-programmable gate array (FPGA), or other digital logic circuitry.

The memory 82 can store instructions for execution by the processor 80, such as predetermined control instructions for the articulating motors 42, 44, 46, 48. The memory 82 can also store information corresponding to the operation of the sleep system 10, such as storing addresses identifying each remote control 32, 34 or each articulating motor 42, 44, 46, 48. The memory 82 can also store other information regarding the components of the sleep system 10, such as the present configuration of each articulable section 24, 26, 28, 30, or the present position of each articulating motor 42, 44, 46, 48, or both. The memory 82 can also store preset positions of each articulable section 24, 26, 28, 30 or each articulating motor 42, 44, 46, 48, or both, with each preset position corresponding to a particular preset position of the sleep areas 20, 22 (as described in more detail above). The memory 82 can include any electronic data storage media, such as any one or more of random access memory (RAM), read-only memory (ROM), electronically-erasable programmable ROM (EEPROM), flash memory, and the like.

Alternatively, or in conjunction with the memory 82, the sleep system 10 can include one or more positional sensors configured to determine a position or orientation of each of the articulable sections 24, 26, 28, 30 or each of the articulating motors 42, 44, 46, 48, or both. The one or more positional sensors can transmit the position or orientation of each articulable section 24, 26, 28, 30 or each articulating motor 42, 44, 46, 48, or both, to the controller 70. Examples of positional sensors that can be used with the sleep systems of the present disclosure include, but are not limited to, accelerometers and gyroscope positional or orientation sensors. Alternatively, a sensor can be included on the motors 42, 44, 46, 48, such as a motor encoder, to determine a position of the motor or an actuater moved by the motor. Other types of positional or orientation sensors can be used.

The power source 84 can comprise power circuitry that is connectable to an external power supply, such as a standard alternating current (AC) power supply. The power source 84 can also include a battery, such as a non-rechargeable primary cell battery or a rechargeable battery, which can be coupled to the power circuitry.

As described above, each sleep area 20, 22 can be controlled by a corresponding remote control 32, 34, such as the first remote control 32 controlling the first sleep area 20 and the second remote control 34 controlling the second sleep area 22. As further described above, the sleep system 10 can be configured so that the first remote control 32 is linked to the first sleep area 20, e.g., so that when the first occupant 14 selects a movement command on the first remote control 32, the articulation system 40 correctly articulates the first sleep area 20 occupied by the first occupant 14 rather than the second sleep area 22 occupied by the second occupant 16. Similarly, the sleep system 10 can be configured so that the second remote control 34 is linked to the second sleep area 22.

In order to ensure proper linking between each remote control 32, 34 and the corresponding sleep area 20, 22, each remote control 32, 34 can have an address or other unique identifier. The address can allow the controller 70 (e.g., the controller 50 or the controllers 64A, 64B) to identify which remote control 32, 34 is sending a movement control signal. For example, when the first remote control 32 sends a movement control signal to the controller 70, the movement control signal can include a header that includes the address for the first remote control 32. Upon receiving the movement control signal, the controller 70 can read the header including the address and determine that the movement control signal came from the first remote controller 32. The controller 70 can then determine that the movement control signal should correspond to the first sleep area 20, and the controller 70 can relay a corresponding motor control signal or signals to the first head motor 42 or the first leg motor 44, or both. Similarly, when the second remote control 34 sends a movement control signal to the controller 70, the movement control signal can include a header with the address for the second remote control 34. The controller 70 can then send a corresponding control signal to the second head motor 46 or to the second leg motor 48, or both.

Each remote control 32, 34 can be configured to allow an occupant 14, 16 operating the remote control 32, 34 to select a specific, desired movement of the sleep system 10. Selection of the desired movement by the occupant 14, 16 can, in turn, trigger a corresponding movement control signal to be sent from the remote control 32, 34 to the controller 70. Examples of movements that can be selected by an occupant 14, 16 on each remote control 32, 34 can include, but are not limited to, at least one of the following commands: raise a first section, e.g., a command to raise a head section 24, 28; lower a first section, e.g., a command to lower a head section 24, 28; raise a second section, e.g., a command to raise a leg section 26, 30; lower a second section, e.g., a command to lower a leg section 26, 30; move one or both of the first section and the second section into a preset position, such as a flat position, a reading position, a "watch TV" position, and so forth.

Each command can be activated by activating a particular button, series of buttons, or series of menu selections, on the remote control 32, 34. Each button or menu selection can be a physical button or can be a virtual button, such as a button on a touch screen, or a series of button presses or menu prompts that are entered through physical or virtual buttons.

As noted above, each remote control 32, 34 can be configured to control the articulation of the articulable sections 24, 26, 28, 30 of a corresponding sleep area 20, 22. In other words, each occupant 14, 16 can control the articulation of his or her own sleep area 20, 22. For example, as described above, the first remote control 32 can be linked to the first sleep area 20, e.g., so that the first occupant 14 can control articulation of the first sleep area 20 upon which the first occupant 14 is resting. Similarly, the second remote control 34 can be linked to the second sleep area 22, e.g., so that the second occupant 16 can control articulation of the second sleep area 22 upon which the second occupant 16 is resting.

In an example, one or both of the remote controls 32, 34 can be configured to not only control articulation of a corresponding sleep area 20, 22, but can also be configured to control one or more specific aspects of articulation of the opposite sleep area 20, 22. For example, while the first remote control 32 can be configured to provide total control over articulation of the first sleep area 20, the first remote control 32 can also be configured to move the second sleep area 22 into a specific, predetermined position or preset.

In one configuration, the first remote control 32 can be configured to place the second sleep area 22 into a snore-reducing preset position (described above). For example, the first remote control 32 can be configured so that if the first occupant 14 selects a particular button, a particular button sequence, or a particular menu sequence on the first remote control 32, then the second sleep area 22 will be articulated into the snore-reducing position. Similarly, the second remote control 34 can be configured so that if the second occupant 16 selects a particular button, button sequence, or menu sequence, then the first sleep area 20 will be articulated into the snore-reducing position. For the purposes of brevity, the remainder of this disclosure will describe the first remote control 32 being configured to adjust the second sleep area 22. However, it is to be understood that a similar configuration could be applied to the second remote control 34 controlling the first sleep area 20 without varying from the scope of the present disclosure.

In an example, the first remote control 32 can be configured to allow for full intended control of the articulation of the first sleep area 20 by the first occupant 14, while only allowing the first remote control 32 to select the predetermined position (e.g., the snore-reducing position) of the second sleep area 22.

In an example, when the first remote control 32 is being used by the first occupant 14 to control the articulation of the first sleep area 20 (e.g., the sleep area upon which the first occupant 14 is resting), then the controller 50, 64A can be configured to move the articulation motors 42, 44 of the first sleep area 20 at a first speed. However, when the first remote control 32 is being used by the first occupant 14 to move the second sleep area 22 into the predetermined position or preset, the controller 50, 64B can be configured to move the articulation motors 46, 48 of the second sleep area 22 at a second speed that is different than the first speed. The second speed can also be different than the speed at which the motors 46, 48 would move if the second occupant 16 had used the second remote control 34 to select the same predetermined position or preset.

In an example, the second speed of the motors 46, 48 can be slower than the first speed. A slower second speed can be desirable because, as described above, the second occupant 16 can be asleep, and a slower speed can prevent or reduce the likelihood of the second occupant 16 waking up as the second sleep area 22 is moved to the predetermined position or preset. For example, if a "Partner Snore" feature is implemented, then the first occupant 14 can be selecting the snore-reducing position because the second occupant 16 is snoring, and therefor asleep, on the second sleep area 22.

Figure 8:
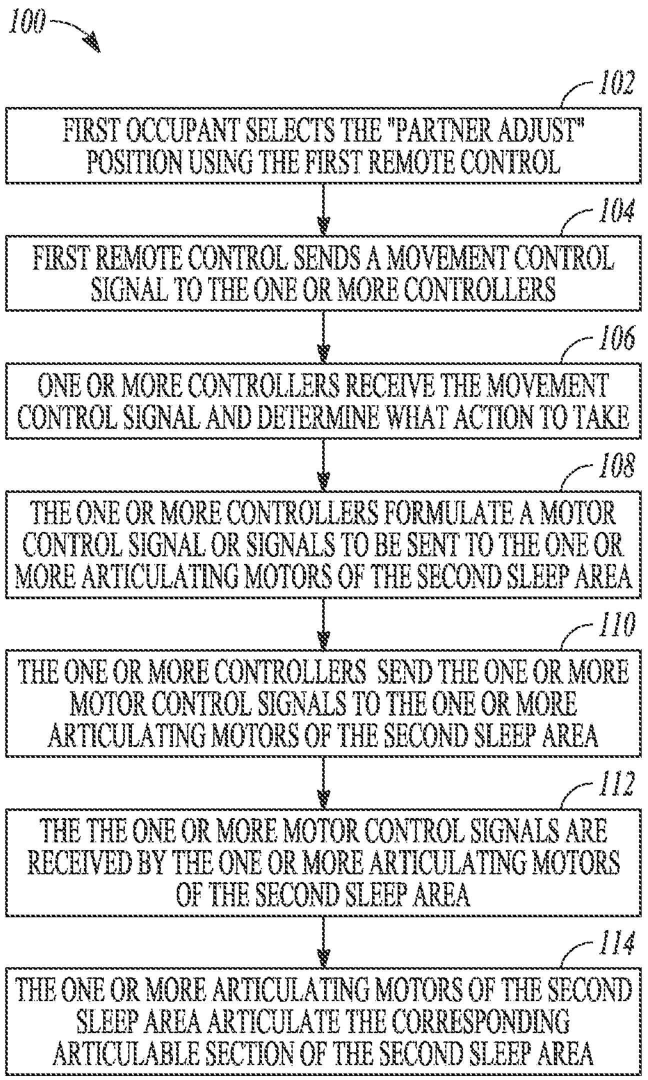
FIG. 8 is a flow diagram of an example method for controlling a sleep system.

FIG. 8 is a flow diagram of an example method 100 for the first remote control 32 controlling full articulation of the first sleep area 20 and placing the second sleep area 22 into a predetermined "Partner Snore" position, e.g, that will place the second sleep area 22 into the snore-reducing position. At 102, the first occupant 14 selects the "Partner Adjust" position using the first remote control 32. For example, the first occupant 14 can select a specific button or combination of buttons on the first remote control 32 that correspond to the "Partner Snore" position.

At 104, the first remote control 32 can send a movement control signal to one or more controllers, such as the single controller 50 (FIG. 5) or the two or more controllers 64A, 64B (FIG. 6). The movement control signal can include a first address or other unique identifier that identifies that it is the first remote control 32 that is sending the movement control signal. Similarly, the second remote control 34 can send an address that is different from that of the address from the first remote control 32. The movement control signal can also include a second address or unique identifier that indicates which sleep area 20, 22 is to be moved according to the movement control signal. In an example, the movement control signal can include a header that includes a predetermined sequence of the first address (e.g., identifying the remote control 32, 34 sending the signal) and the second address (e.g., identifying the sleep area 20, 22 to be moved according to the instructions in the signal).

In the case of the "Partner Snore" control signal, wherein the first controller 32 has sent a movement control signal to move the second sleep area 22 into the snore-reduction position, then the movement control signal can include an indication that the movement is for the opposite sleep area from the remote control 32, 34 that sent the movement control signal. For example, the movement control signal can come from the first remote control 32, but can include a movement control signal configured to articulate motion of one or more sections of the second sleep area 22, such as a control signal configured to cause the second head motor 46 to articulate the second head section 28 to the snore-reducing angle θ relative to horizontal, as described above.

At 106, the one or more controllers 50, 64A, 64B receive the movement control signal and determine what action to take. Determining what action to take can include the controller 50, 64A, 64B determining which remote control 32, 34 sent the movement control signal, for example by analyzing the header and reading the address contained therein. The controller 50, 64A, 64B can then determine whether the movement control signal is intended for itself, or for another controller 50, 64A, 64B. In the case of a single controller 50, each movement control signal is intended for the controller 50 unless a remote control from another sleep system is being used. However, when more than one controller 64A, 64B is included, as in FIG. 6, then movement control signals from the first remote control 32 are only intended for the first controller 64A, and movement control signals from the second remote control 34 are only intended for the second controller 64B (as described above). For example, if the first controller 64A receives a movement control signal with an address corresponding to the first remote control 32, then the first controller 64A can determine that it should pass the movement control on to its corresponding articulating motors 42, 44. But, if the first controller 64A receives a movement control signal with an address corresponding to the second remote control 34, then the first controller 64A can choose to ignore the movement control signal or alternatively can pass the signal to the second controller 64B, e.g., via the cable 69.

At 108, the one or more controllers 50, 64A, 64B can formulate a motor control signal or signals that are to be sent to one or more of the articulating motors 42, 44, 46, 48. The motor control signal or signals for each articulating motor 42, 44, 46, 48 can include what action the articulating motor 42, 44, 46, 48 should take, such as what direction the articulating motor 42, 44, 46, 48 should move, at what speed, and for how long. The motor control signal or signals can also include the timing and order of the actions that each articulating motor 42, 44, 46, 48 is to take. In the case of two or more controllers 64A, 64B, the controller 64A, 64B that receives the movement control signal can determine which remote control 32, 34 sent the movement control signal, such as by analyzing the address within the movement control signal, and what articulable section or sections 24, 26, 28, 30 to which the movement control signal is directed. The controller 64A, 64B can then determine whether to send a motor control signal directly to an articulating motor 42, 44, 46, 48 over which the controller 64A, 64B has direct control, or to send the motor control signal to the other controller 64A, 64B, such as via the cable 69.

For example, if the first controller 64A receives a movement control signal from the first remote control 32 indicating that the first head section 24 or the first leg section 26, or both, should be articulated, then the controller 64A can determine that a motor control signal can be sent directly to the first head motor 42 or the first leg motor 44, or both. Conversely, if the first controller 64A receives a movement control signal from the first remote control 32 indicating that the second head section 28 or the second leg section 30, or both, should be articulated (e.g., to move the second sleep area 22 into the snore-reducing position), then the controller 64A can send a control signal to the second controller 64B, via the cable 69, that will trigger the second controller 64B to formulate one or more appropriate motor control signals for the second head motor 46 or the second leg motor 48, or both.

At 110, the one or more controllers 50, 64A, 64B send the one or more motor control signals to the appropriate articulating motor or motors 42, 44, 46, 48, such as via the cables 56, 66, or 68. In an example, the motor control signal can include an address or unique identifier corresponding to the articulating motor 42, 44, 46, 48 to which the control signal is being directed. The address can be placed in a header of the control signal, similar to the address for the remote controls 32, 34 in the movement control signals described above.

In the case of a "Partner Snore" signal that was sent from the first controller 32, the controller 50 or 64B can send a motor control signal to the second head motor 46 that will move the second head section 28 to be at the snore-reducing angle θ, described above. The controller 50 or 64B can also send a motor control signal to the second leg motor 48 to move the second led section 30 into a flat position, e.g., a horizontal or substantially horizontal position.

In an example, before sending a signal to the articulating motors 42, 44, 46, 48, the controller 50 or 64B can determine the current position of each section 28, 30 of the second sleep area 22. For example, after accessing the current positions of the second head section 28 and the second leg section 30 from the memory of the controller 50, 64B (e.g., the memory 82 of controller 70 described above with respect to FIG. 7) or by requesting a position or orientation determination from a position sensor for each section 28, 30, the controller 50, 64B can then determine what direction each section 28, 30 of the second sleep area 22 is to be moved in order to facilitate the desired position (e.g., the snore-reducing position). The controller 50, 64B can then send a motor control signal to each motor 46, 48 of the second sleep area 22 that corresponds to the direction in which each section 28, 30 of the second sleep area 22 is to be articulated.

At 112, the motor control signal or signals are received by one or more of the articulating motors 46, 48 associated with the second sleep area 22, e.g., the second head motor 46 and the second leg motor 48. At 114, each motor 46, 48 can then articulate a corresponding section (e.g., the second head section 28 being articulated by the second head motor 46 and the second leg section 30 being articulated by the second head motor 48) so that the second sleep area is moved into the desired position, e.g., the snore-reducing position.

The ability for the first remote control 32 to move the second sleep area 22 into a predetermined position, such as the snore-reducing position, can have advantages that are not realized in other sleep systems. For example, such a configuration can allow the first occupant 14 who is being disturbed by the snoring of the second occupant 16 to reduce or alleviate the snoring by simply selecting an option on the first remote control 32, which presumably can be conveniently located relative to the first occupant 14 because the first remote control 32 is also configured to control the first sleep area 20. The use of the first remote control 32 to adjust the second sleep area 22 can provide a convenient and effective solution to the first occupant 14.

Such a configuration can also allow the first occupant 14 to reduce or eliminate the snoring of the second occupant 16 without having to disturb the sleep of the second occupant 16, e.g., without having to wake or otherwise disturb the second occupant 16. Thus, the sleep systems of the present disclosure can provide for a better sleep experience for the second occupant 16.

The configuration described herein can also provide a more lasting solution to snoring by the second occupant 16. As noted above, previously, the first occupant 14 might attempt to remedy the snoring of the second occupant 16 by waking the second occupant 16. The awakened second occupant 16 may temporarily cease snoring, but often the snoring will continue once the second occupant 16 goes back to sleep because the bed upon which the second occupant 16 is sleeping is still in the same snore-inducing position as before. The systems 10, 60 of the present disclosure allow the first occupant 14 to reduce or eliminate snoring of their partner by placing the second sleep area 22 into a different position than it was when the second occupant 16 began snoring. Thus, the systems 10, 60 of the present disclosure can be more likely to reduce or eliminate snoring The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented, at least in part. Some examples can include a computer-readable medium or machine-readable medium encoded with instructions operable to configure an electronic device to perform methods or method steps as described in the above examples. An implementation of such methods or method steps can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Although the invention has been described with reference to exemplary embodiments, workers skilled in the art will recognize that changes may be made in form and detail without departing from the spirit and scope of the invention.

What is claimed is:

1. A controlling device for a sleep system, the controlling device comprising:

a first control button, wherein selection of the first control button causes the controlling device to generate and wirelessly transmit a first set of one or more control signals that, when received by an articulation control system of a bed support, cause the articulation control system to increase an incline angle of a first head support section of the bed support;

a second control button, the second control button being distinct from the first control button, wherein selection of the second control button causes the controlling device to generate and wirelessly transmit a second set of one or more control signals that, when received by the articulation control system of the bed support, cause the articulation control system to decrease the incline angle of the first head support section of the bed support;

a first preset position button, the first preset position button being distinct from the first and second control buttons, wherein selection of the first preset position button causes the controlling device to generate and wirelessly transmit a third set of one or more control signals that, when received by the articulation control system of the bed support, cause the articulation control system to adjust the incline angle of the first head support section of the bed support to a first preset position;

a second preset position button, the second preset position button being distinct from the first and second control buttons and the first preset position button, wherein selection of the second preset position button causes the controlling device to generate and wirelessly transmit a fourth set of one or more control signals that, when received by the articulation control system of the bed support, cause the articulation control system to adjust the incline angle of the first head support section of the bed support to a second preset position, the second preset position being distinct from the first preset position; and an anti-snore preset position button, anti-snore preset position button being distinct from the first and second control buttons and the first and second preset position buttons, wherein selection of the anti-snore preset position button causes the controlling device to generate and wirelessly transmit a fifth set of one or more control signals that, when received by the articulation control system of the bed support, cause the articulation control system to adjust at least a portion of the bed support to a snore-reducing preset position, wherein the articulation control system comprises first and second articulation controllers, wherein the first articulation controller is configured to communicate with the controlling device and a first head articulation motor positioned and configured to articulate the first head support section, wherein the second articulation controller is configured to communicate with a second head articulation motor positioned and configured to articulate a second head support section, wherein the articulation control system comprises first and second leg articulation motors, wherein the first leg articulation motor is positioned and configured to articulate a first leg support section of the bed support, and wherein the second leg articulation motor is positioned and configured to articulate a second leg support section of the bed support, wherein the articulation control system comprises first and second leg articulation motors, wherein the first leg articulation motor is positioned and configured to articulate a first leg support section of the bed support, and wherein the second leg articulation motor is positioned and configured to articulate a second leg support section of the bed support, and wherein the first articulation controller comprises one or more first processors, first memory, and a first communication bus with a plurality of first physical ports, wherein first cables connect the first physical ports to the first head articulation motor and the first leg articulation motor, wherein the second articulation controller comprises one or more second processors, second memory, and a second communication bus with a plurality of second physical ports, wherein second cables connect the second physical ports to the second head articulation motor and the second leg articulation motor.

2. The controlling device of claim 1, wherein the first preset position is an elevated position and the second preset position is a flat position.

3. The controlling device of claim 1, further comprising:

a third control button, wherein selection of the third control button causes the controlling device to generate and transmit a sixth set of one or more control signals that, when received by the articulation control system of the bed support, cause the articulation control system to increase an incline angle of a first leg support section of the bed support; and a fourth control button, wherein selection of the fourth control button causes the controlling device to generate and transmit a seventh set of one or more control signals that, when received by the articulation control system of the bed support, cause the articulation control system to decrease the incline angle of the first leg support section of the bed support.

4. The controlling device of claim 1, wherein the fifth set of one or more control signals, when received by the articulation control system of the bed support, further cause the articulation control system to adjust an incline angle of a leg support section of the bed support to a snore-reducing preset leg position.

5. The controlling device of claim 1, wherein the snore-reducing preset position raises a sleep surface supported by the bed support to a position between about 5° to about 15° from horizontal.

6. The controlling device of claim 1, wherein the first preset position is a preset reading inclined position.

7. The controlling device of claim 6, wherein the second preset position is a preset television viewing inclined position.

8. The controlling device of claim 1, wherein an angle of incline of the first preset position is greater than an angle of incline of the snore-reducing preset position.

9. The controlling device of claim 1, wherein first preset position, the second preset position, and the snore-reducing preset position are not user alterable.

10. A sleep system comprising:

a bed support comprising:

a first support section for supporting a mattress;

a first articulation motor for articulating a first head support section of the first support section of the bed support;

a second articulation motor positioned and configured to articulate a second head support section of the bed support; and an articulation control system configured to control the first articulation motor in response to wirelessly received control signals; and a controlling device comprising:

a first control button, wherein selection of the first control button causes the controlling device to generate and wirelessly transmit a first set of one or more control signals that, when received by the articulation control system of the bed support, cause the articulation control system to increase an incline angle of the first head support section of the bed support;

a second control button, the second control button being distinct from the first control button, wherein selection of the second control button causes the controlling device to generate and wirelessly transmit a second set of one or more control signals that, when received by the articulation control system of the bed support, cause the articulation control system to decrease the incline angle of the first head support section of the bed support;

a first preset position button, the first preset position button being distinct from the first and second control buttons, wherein selection of the first preset position button causes the controlling device to generate and wirelessly transmit a third set of one or more control signals that, when received by the articulation control system of the bed support, cause the articulation control system to adjust the incline angle of the first head support section of the bed support to a first preset position;

a second preset position button, the second preset position button being distinct from the first and second control buttons and the first preset position button, wherein selection of the second preset position button causes the controlling device to generate and wirelessly transmit a fourth set of one or more control signals that, when received by the articulation control system of the bed support, cause the articulation control system to adjust the incline angle of the first head support section of the bed support to a second preset position, the second preset position being distinct from the first preset position; and an anti-snore preset position button, anti-snore preset position button being distinct from the first and second control buttons and the first and second preset position buttons, wherein selection of the anti-snore preset position button causes the controlling device to generate and wirelessly transmit a fifth set of one or more control signals that, when received by the articulation control system of the bed support, cause the articulation control system to adjust at least a portion of the bed support to a snore-reducing preset position, wherein the articulation control system comprises first and second articulation controllers, wherein the first articulation controller is configured to communicate with the controlling device and the first articulation motor, wherein the second articulation controller is configured to communicate with the second articulation motor, wherein the bed support further comprises third, and fourth articulation motors, wherein the third articulation motor is positioned and configured to articulate a first leg support section of the bed support, and wherein the fourth articulation motor is positioned and configured to articulate a second leg support section of the bed support, wherein the first articulation controller is further configured to communicate with the third articulation motor, wherein the second articulation controller is further configured to communicate with the fourth articulation motor; and wherein the first articulation controller comprises one or more first processors, first memory, and a first communication bus with a plurality of first physical ports, wherein first cables connect the first physical ports to the first and third articulation motors, wherein the second articulation controller comprises one or more second processors, second memory, and a second communication bus with a plurality of second physical ports, wherein second cables connect the second physical ports to the second and fourth articulation motors.

11. The sleep system of claim 10, wherein the first preset position is an elevated position and the second preset position is a flat position.

12. The sleep system of claim 10, wherein the first articulation controller is configured to ignore a movement control signal addressed to the second articulation controller when the first articulation controller receives a movement control signal addressed to the second articulation controller.

13. The sleep system of claim 10, wherein the fifth set of one or more control signals, when received by the articulation control system of the bed support, further cause the articulation control system to adjust an incline angle of a leg support section of the bed support to a snore-reducing preset leg position.

14. The sleep system of claim 10, wherein the snore-reducing preset position raises a portion of the mattress to a position between about 5° to about 15° from horizontal.

15. The sleep system of claim 10, wherein the first preset position is a preset reading inclined position.

16. The sleep system of claim 15, wherein the second preset position is a preset television viewing inclined position.

17. A controlling device for a sleep system, the controlling device comprising:

a first control button, wherein selection of the first control button causes the controlling device to generate and wirelessly transmit a first set of one or more control signals that, when received by an articulation control system of a bed support, cause the articulation control system to increase an incline angle of a first head support section of the bed support;

a second control button, the second control button being distinct from the first control button, wherein selection of the second control button causes the controlling device to generate and wirelessly transmit a second set of one or more control signals that, when received by the articulation control system of the bed support, cause the articulation control system to decrease the incline angle of the first head support section of the bed support;

a first preset position button, the first preset position button being distinct from the first and second control buttons, wherein selection of the first preset position button causes the controlling device to generate and wirelessly transmit a third set of one or more control signals that, when received by the articulation control system of the bed support, cause the articulation control system to adjust the incline angle of the first head support section of the bed support to a first preset position;

a second preset position button, the second preset position button being distinct from the first and second control buttons and the first preset position button, wherein selection of the second preset position button causes the controlling device to generate and wirelessly transmit a fourth set of one or more control signals that, when received by the articulation control system of the bed support, cause the articulation control system to adjust the incline angle of the first head support section of the bed support to a second preset position, the second preset position being distinct from the first preset position; and an anti-snore preset position button, anti-snore preset position button being distinct from the first and second control buttons and the first and second preset position buttons, wherein selection of the anti-snore preset position button causes the controlling device to generate and wirelessly transmit a fifth set of one or more control signals that, when received by the articulation control system of the bed support, cause the articulation control system to adjust at least a portion of the bed support to a snore-reducing preset position;

wherein the articulation control system comprises first and second head articulation motors and first and second leg articulation motors, wherein the first head articulation motor is positioned and configured to articulate the first head support section, wherein the first leg articulation motor is positioned and configured to articulate a first leg support section of the bed support, wherein the second head articulation motor is positioned and configured to articulate a second head support section of the bed support, and wherein the second leg articulation motor is positioned and configured to articulate a second leg support section of the bed support; and wherein the articulation control system comprises first and second articulation controllers, wherein the first articulation controller is configured to communicate with the controlling device, the first head articulation motor, and the first leg articulation motor, wherein the second articulation controller is configured to communicate with the second head articulation motor, and the second leg articulation motor; and wherein the first articulation controller comprises one or more first processors, first memory, and a first communication bus with a plurality of first physical ports, wherein first cables connect the first physical ports to the first head articulation motor and the first leg articulation motor, wherein the second articulation controller comprises one or more second processors, second memory, and a second communication bus with a plurality of second physical ports, wherein second cables connect the second physical ports to the second head articulation motor and the second leg articulation motor.

* * * * *